United States Patent [19]
Waarts et al.

[11] Patent Number: 5,933,271
[45] Date of Patent: *Aug. 3, 1999

[54] OPTICAL AMPLIFIERS PROVIDING HIGH PEAK POWERS WITH HIGH ENERGY LEVELS

[75] Inventors: Robert G. Waarts, Fremont; Steven Sanders, Mountain View; David F. Welch, Menlo Park, all of Calif.

[73] Assignee: SDL, Inc., San Jose, Calif.

[ * ] Notice: This patent is subject to a terminal disclaimer.

[21] Appl. No.: 09/017,532

[22] Filed: Feb. 2, 1998

Related U.S. Application Data

[62] Division of application No. 08/588,747, Jan. 19, 1996, Pat. No. 5,867,305.

[51] Int. Cl.⁶ ...................................................... H01S 3/00
[52] U.S. Cl. ................................ 359/341; 359/345; 372/6
[58] Field of Search ...................... 359/341, 345; 372/6

[56] References Cited

U.S. PATENT DOCUMENTS

| | | | |
|---|---|---|---|
| 4,136,929 | 1/1979 | Suzaki | 350/96 |
| 5,050,949 | 9/1991 | DiGiovanni et al. | 359/341 |
| 5,128,800 | 7/1992 | Zirngibl | 359/341 |
| 5,175,643 | 12/1992 | Andrews | 359/339 |
| 5,185,826 | 2/1993 | Delavaux | 385/24 |
| 5,218,608 | 6/1993 | Aoki | 372/6 |
| 5,218,665 | 6/1993 | Grasso et al. | 385/142 |
| 5,232,404 | 8/1993 | Felstehausen | 460/48 |
| 5,276,758 | 1/1994 | Hughes | 385/116 |
| 5,303,314 | 4/1994 | Duling, III et al. | 385/11 |
| 5,331,449 | 7/1994 | Huber et al. | 359/125 |
| 5,335,236 | 8/1994 | Toeppen | 372/25 |
| 5,337,175 | 8/1994 | Ohnsorge et al. | 359/125 |
| 5,339,183 | 8/1994 | Suzuki | 359/123 |
| 5,392,308 | 2/1995 | Welch et al. | 372/92 |
| 5,400,350 | 3/1995 | Galvanauskas | 372/20 |
| 5,696,782 | 12/1997 | Harter et al. | 372/25 |

OTHER PUBLICATIONS

J.D. Minelly et al., "Femtosecond Pulse Amplification in Cladding–pumped Fibers", Optics letters, Sep. 1, 1995, vol. 20, No. 17, pp. 1797–1799.

B. Desthieux et al., "111 kW (0.5 mJ) Pulse Amplification at 1.5 micron Using a Gated Cascade of Three Erbium–doped Fiber Amplifiers", Appl. Phys. Lett. Aug. 2, 1993, 63 (5) pp. 586–588.

(List continued on next page.)

*Primary Examiner*—Mark Hellner
*Attorney, Agent, or Firm*—W. Douglas Carothers, Jr.

[57] ABSTRACT

Two approaches are provided for achieving an optical amplifier system capable of producing high peak power, high energy pulse outputs while suppressing scattering noise. The first approach relates to an optical amplifier system which has at least one laser diode pulsed or cw pumped double clad fiber amplifier utilized for receiving a high frequency modulated injected signal pulse of short duration from the laser diode, via the fiber core, for amplification by coupling pump light into the inner cladding of the fiber. The average signal power is sufficient to saturate the gain of the fiber so as to minimize significant onset and buildup of forward and backward scattering noise. The duty cycle of the injected signal source pulse is chosen to allow adequate gain recovery in the fiber amplifier between pulses. The second approach relates to a cascaded optical amplifier system having at least two optical amplifying stages with two pulsed pump sources providing and two amplifying media, the first of which receives the injection and at least one pump signal wherein the injection pulsed signal is amplified to a first power and energy level. The second amplifying medium, optically coupled to the first, amplifies the first level signal to a second level amplified, injection pulsed signal. The duty cycle of the injection pulsed optical signal is synchronized with the first and second pulsed pump signals with the first pulsed pump signal having a different duration in the duty cycle than the second pulsed pump signal.

82 Claims, 11 Drawing Sheets

OTHER PUBLICATIONS

Johan Nilsson et al., "Modeling and Optimization of Low–repetion–rate High–energy Pulse Amplification in cw–Pumped Erbium–doped Fiber Amplifiers", Optical Society of America, Dec. 15, 1993, vol. 18, No. 24, pp. 2099–2101.

K.Y. Ko et al., "Transient Analysis of Erbium–doped Fiber Amplifiers", IEEE Photonics Technology Letters, Dec., 1994, vol. 6, No. 12, pp. 1436–1438.

John Sweetser et al., "Efficient high repetition rate synchronous amplification of a passively mode–locked femtosecond dye laser", Applied Optics, Aug. 20, 1993, vol. 32, No. 24, pp. 4471–4479.

Zhu Lei et al., "High–repetition Tunable Picosecond Dye Laser Pumped by a Copper Bromide Laser", IEEE Journal of Quantum Electronics, Feb. 27, 1992, No. 2, pp. 283–287.

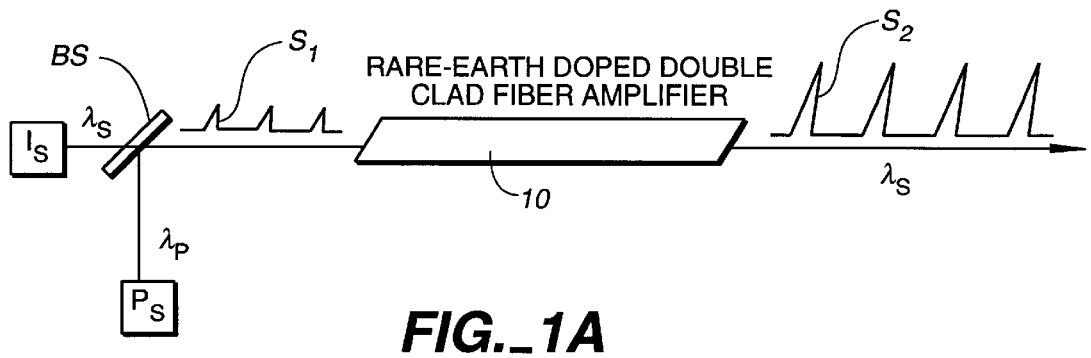
FIG._1A
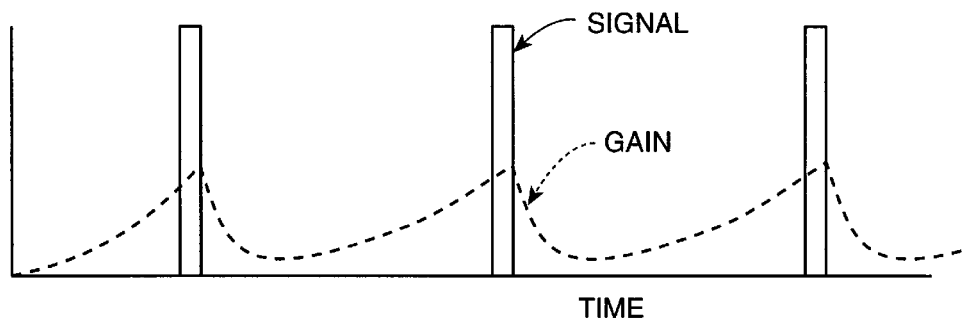
FIG._1D
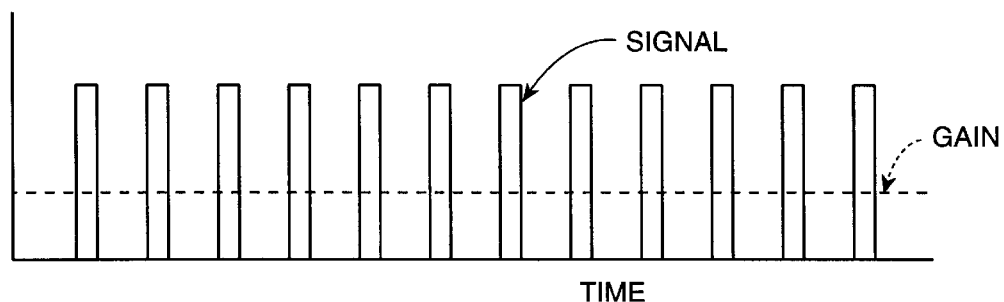
FIG._1E

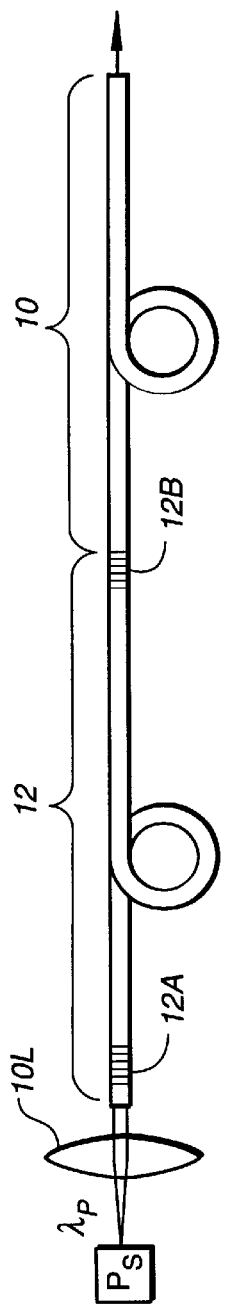
FIG._1B
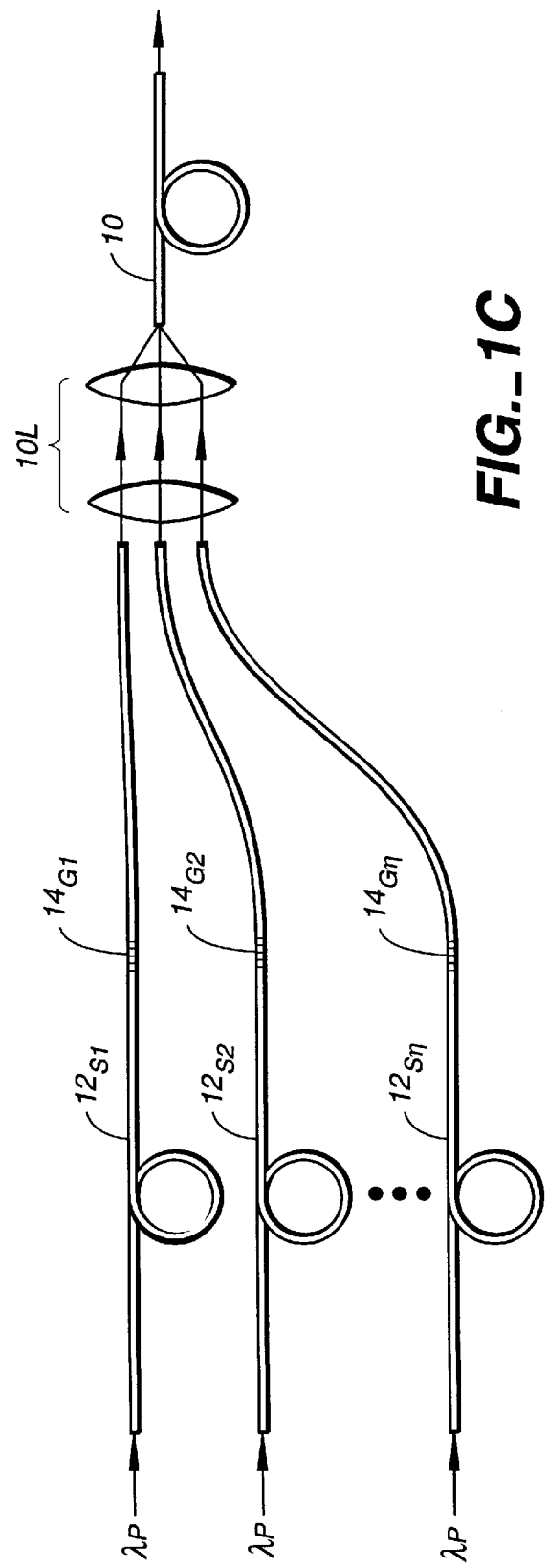
FIG._1C

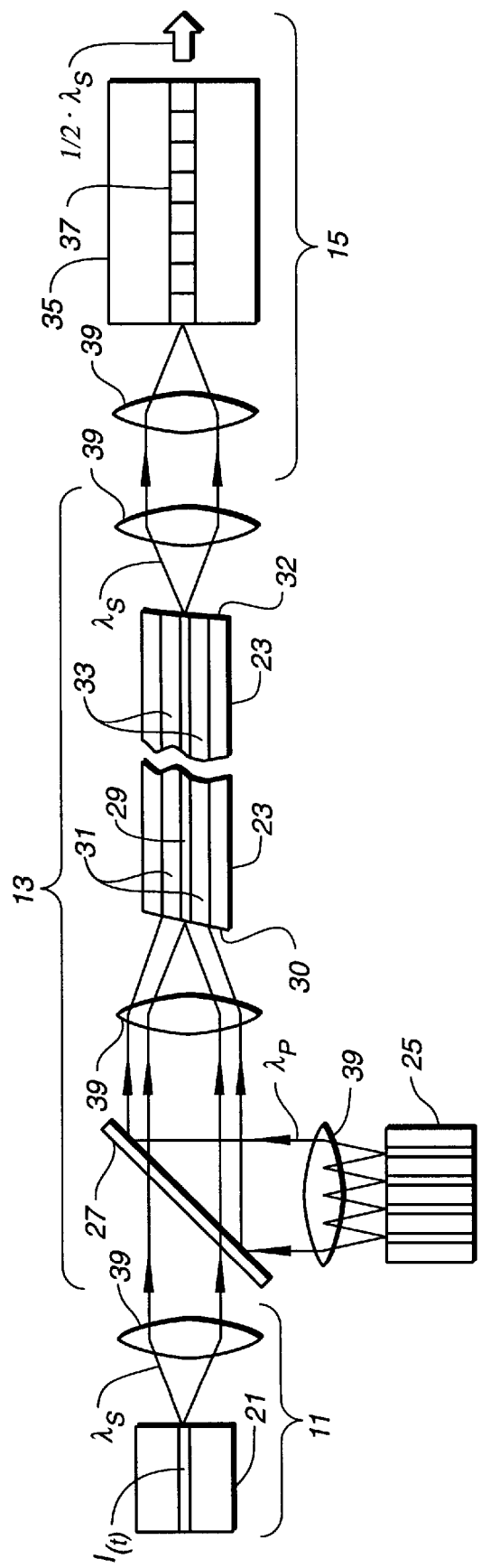
FIG._2

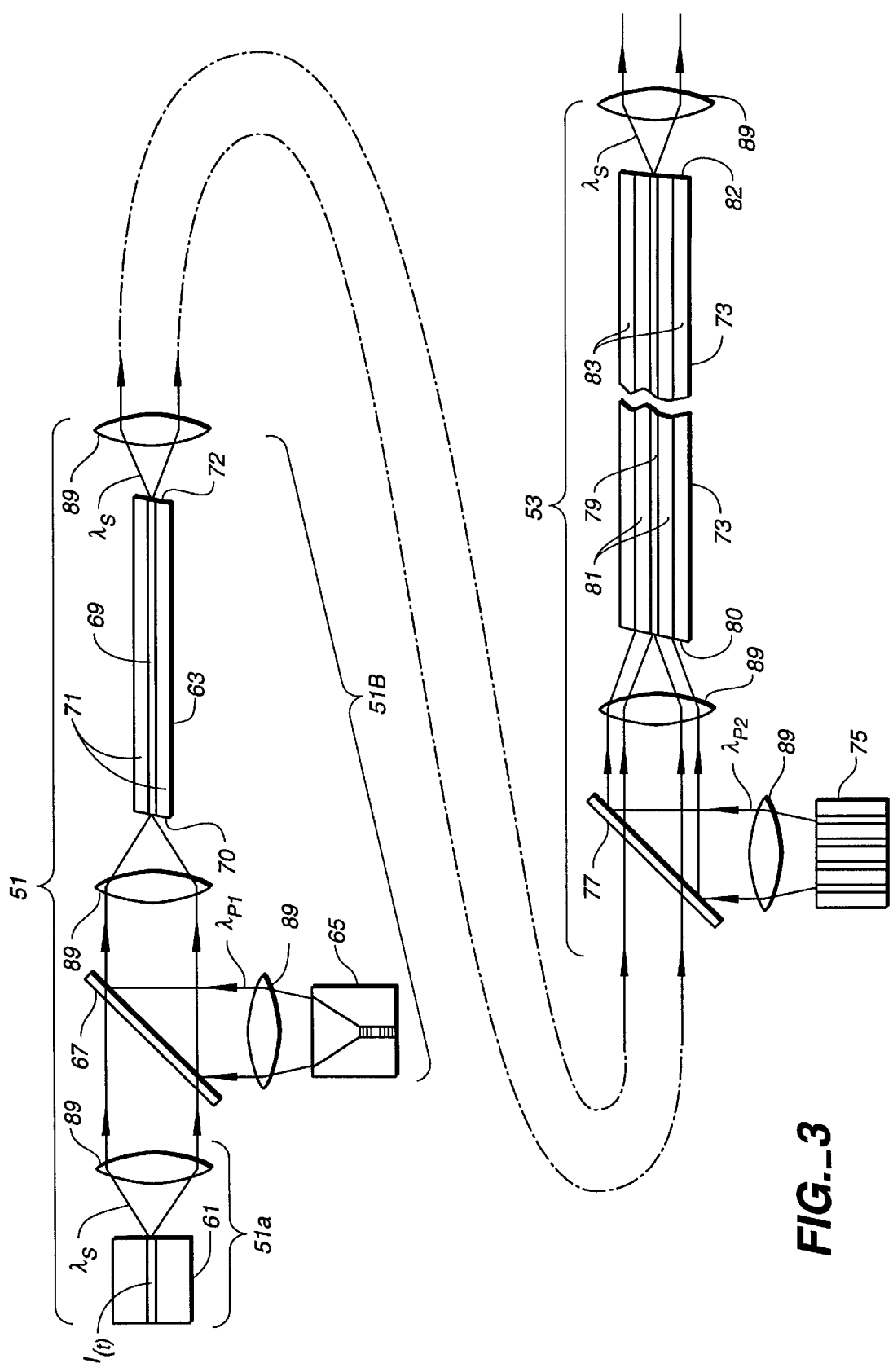
FIG._3

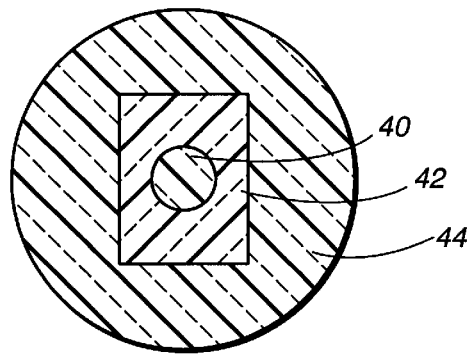
FIG._4
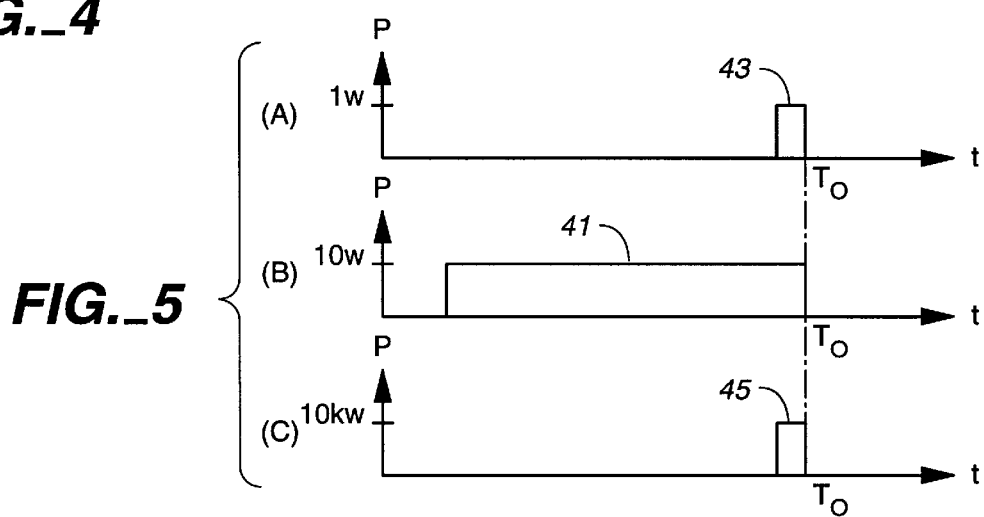
FIG._5
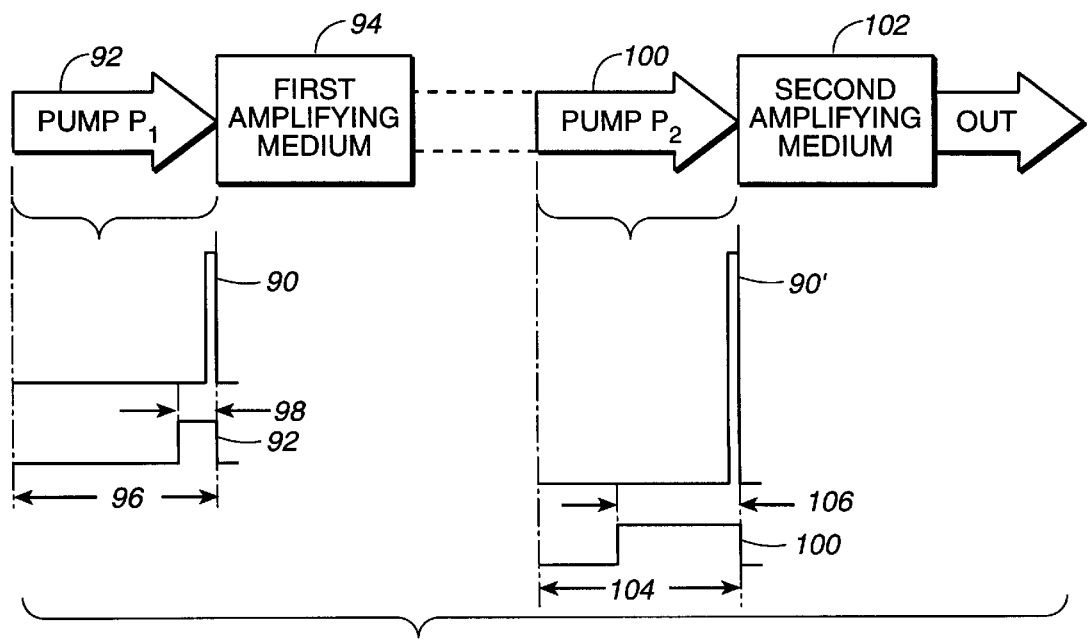
FIG._6

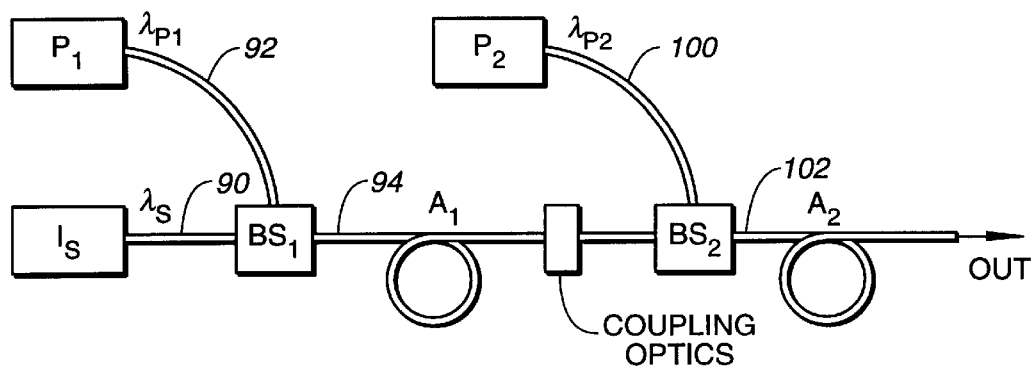
FIG._7
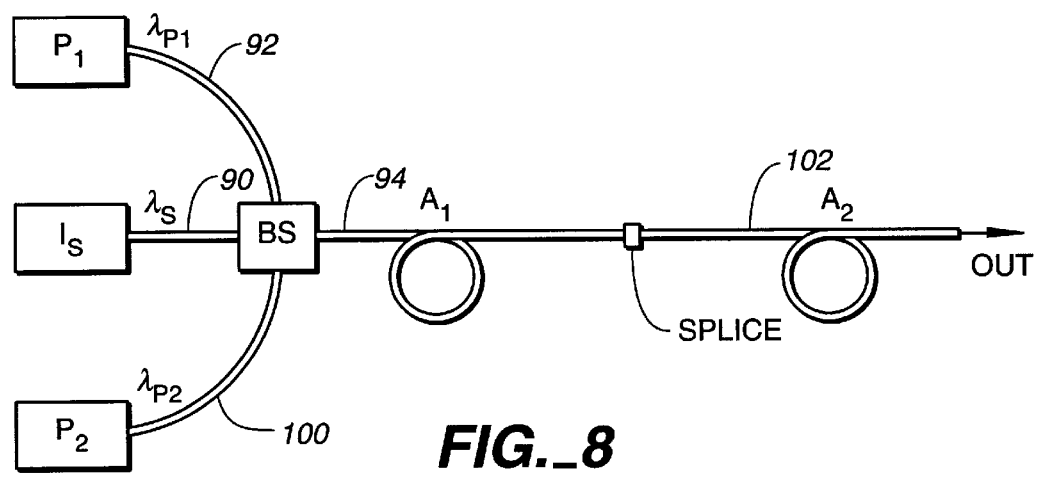
FIG._8
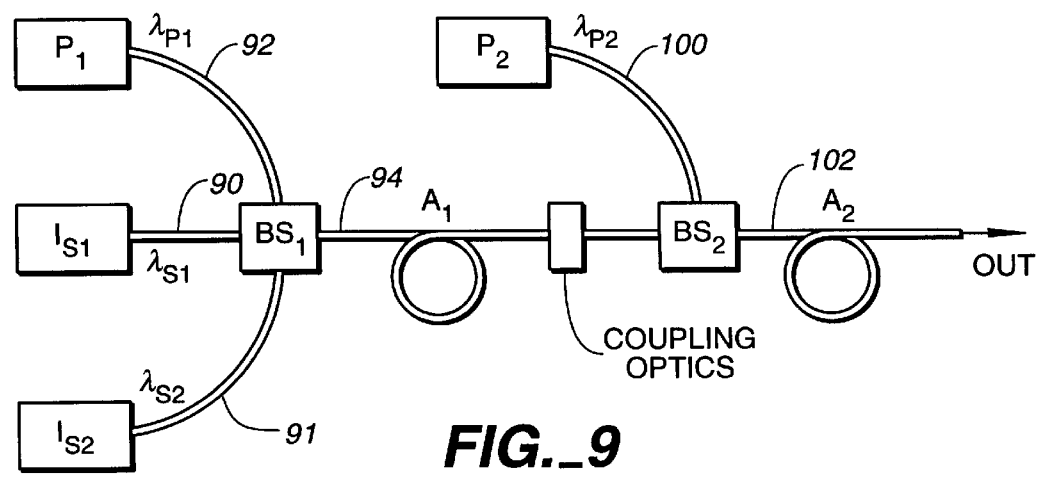
FIG._9

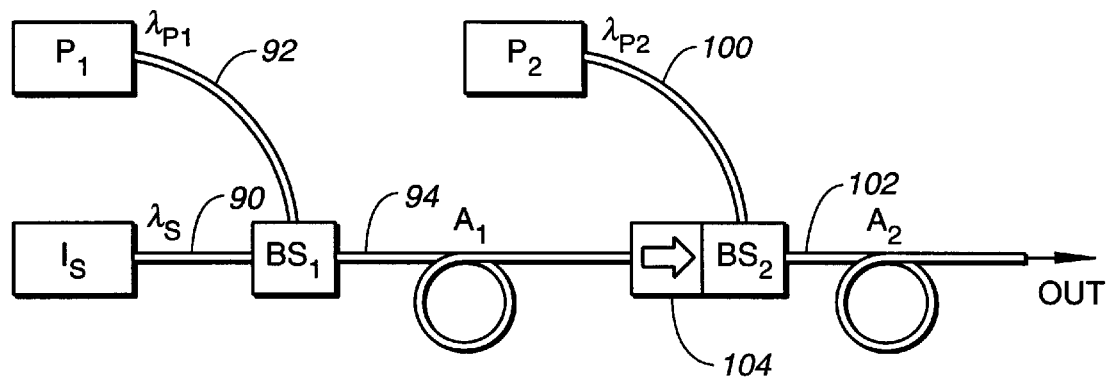
FIG._10
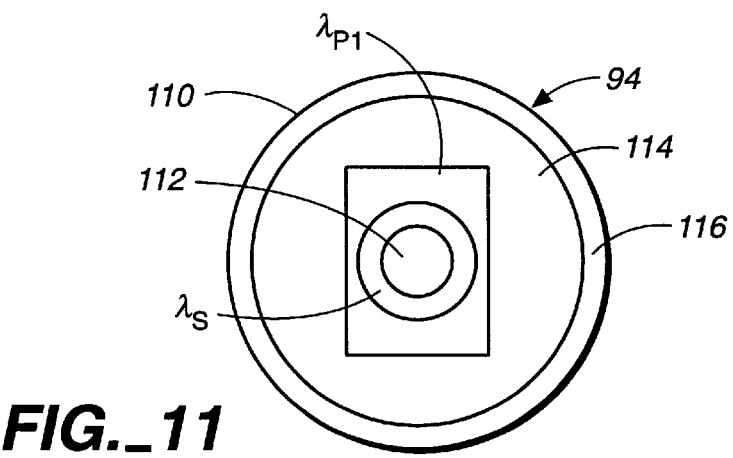
FIG._11
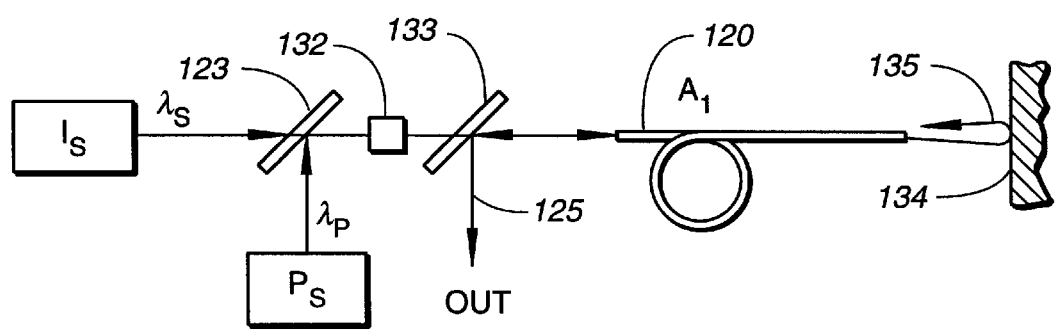
FIG._13

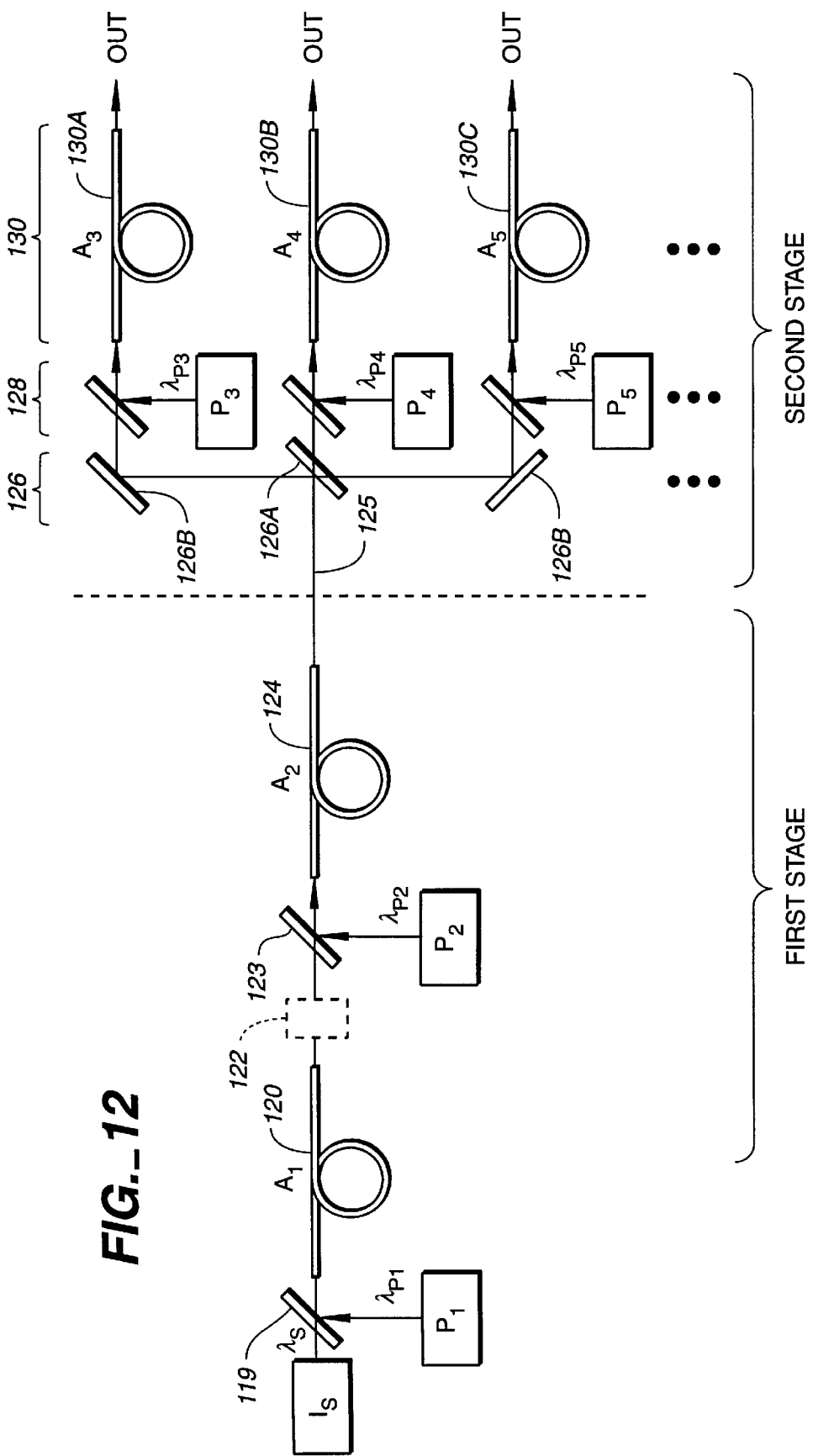
FIG._12

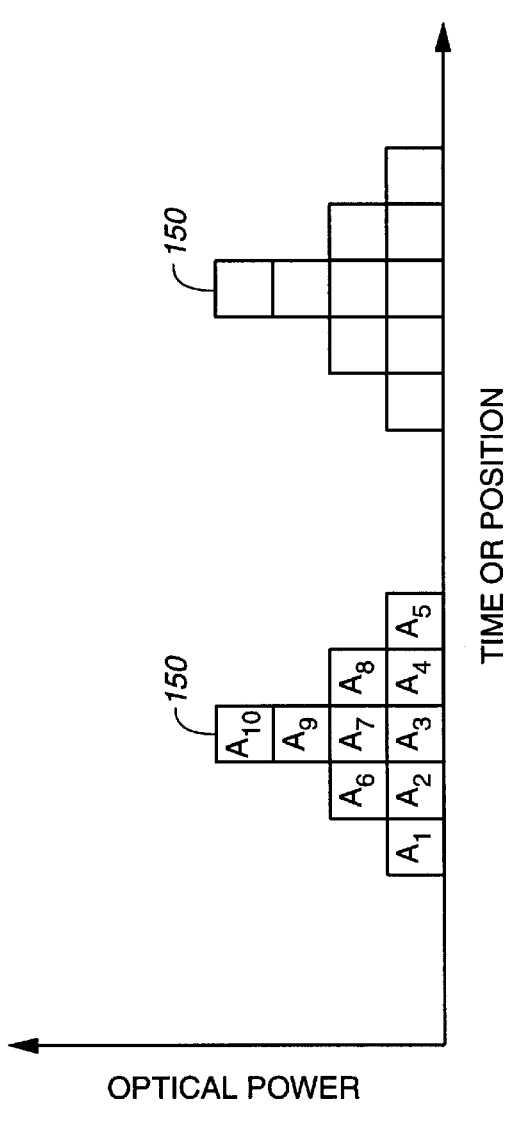
FIG._12A
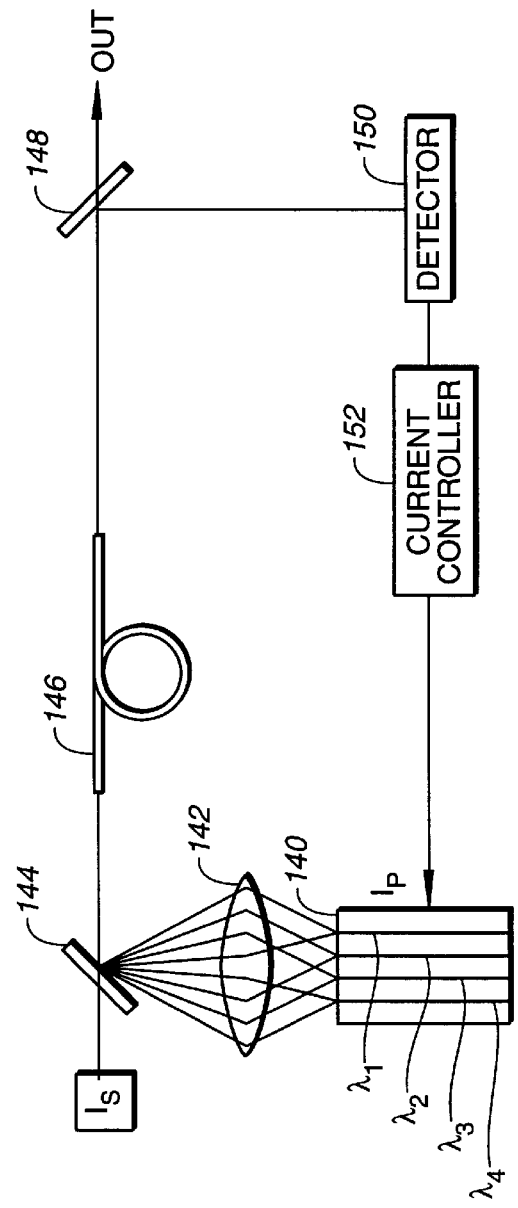
FIG._14

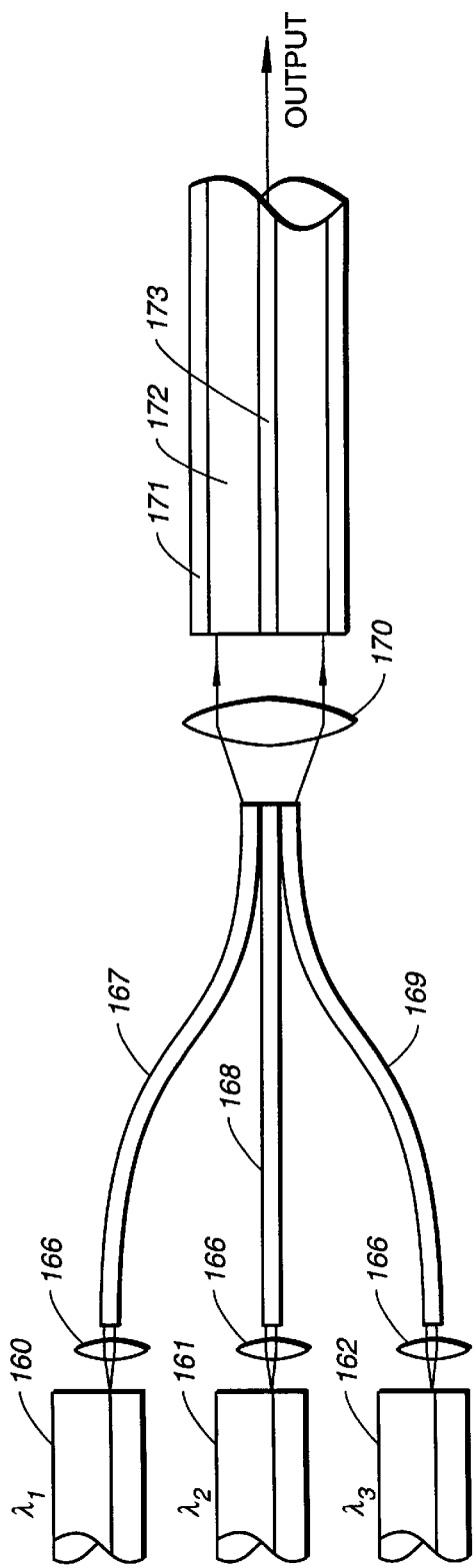
FIG._15A
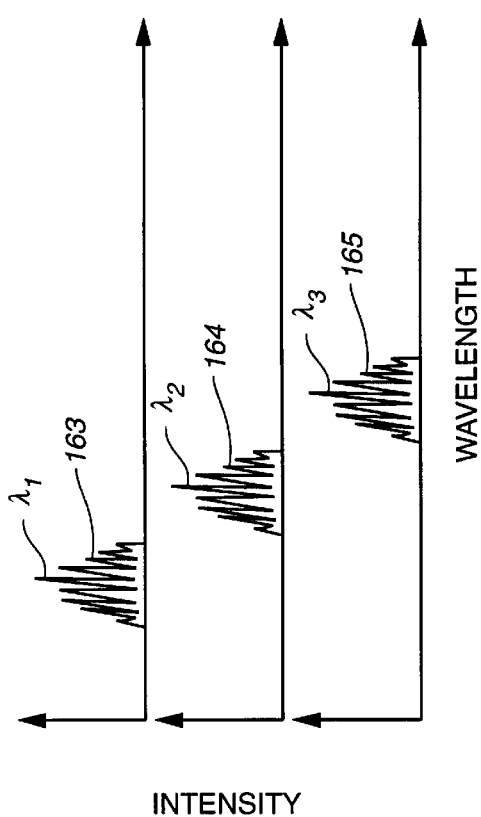
FIG._15B

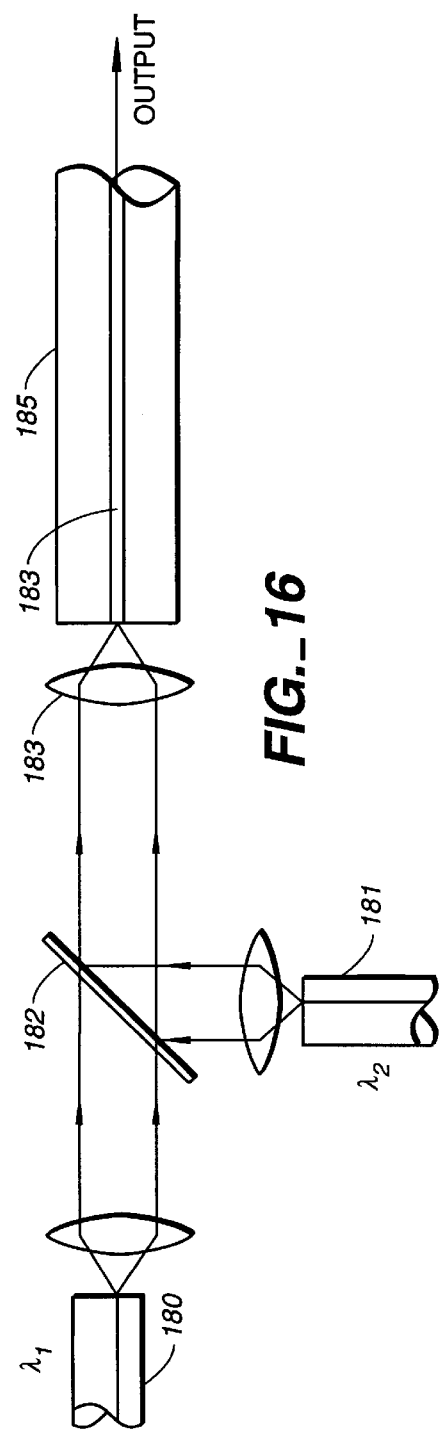
FIG._16
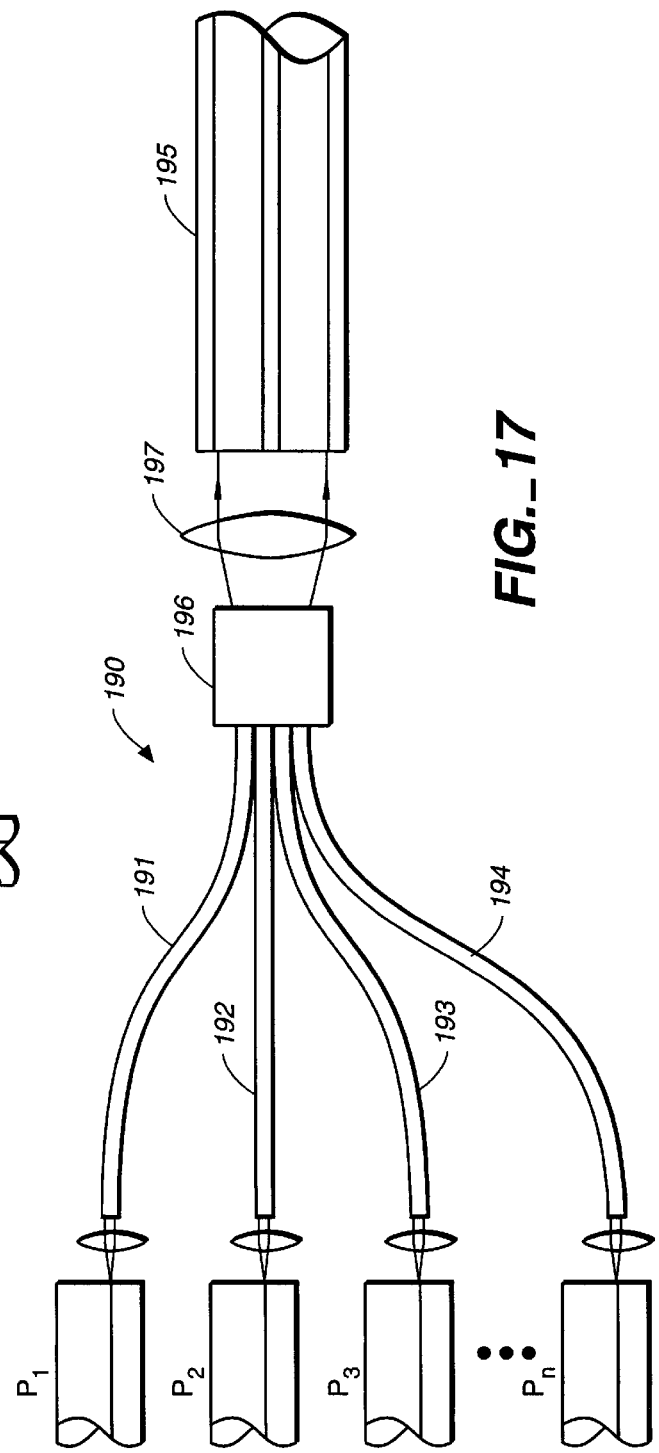
FIG._17

OPTICAL AMPLIFIERS PROVIDING HIGH PEAK POWERS WITH HIGH ENERGY LEVELS

CROSS REFERENCE TO RELATED APPLICATION

This application is a 37CFR 1.53(b) divisional application of application Ser. No. 08/588,747 filed Jan. 19, 1996 now Pat. No. 5,867,305.

BACKGROUND OF THE INVENTION

1. Technical Field

The present invention relates to optical gain media and, more particularly, to solid state gain media such as an optical fiber amplifier or cascaded optical fiber amplifiers to provide pulse outputs of high power in the kW to MW range and high energy levels in the mJ range. As used herein, solid state gain medium is in reference to a optical fiber amplifier or laser.

2. Background Art

Optical fiber amplifiers receive coherent light of relatively low power from laser injection sources and amplify the light to higher power. Such amplifiers have been used in fiberoptic telecommunications and cable television systems to boost the power of a modulated optical signal being transmitted along a fiber transmission line. Erbium-doped fiber amplifiers (EDFAs) have been found to be especially convenient for fiber communication systems because their amplification wavelength length (near 1.54 $\mu$m) is conducive to low loss propagation of optical signals in glass transmission fibers. Various U.S. patents describe such systems, and the fiber amplifiers used by them, including but not limited to U.S. Pat. No. 5,185,826 (Delavaux); U.S. Pat. No. 5,218,608 (Aoki); U.S. Pat. No. 5,218,665 (Grasso et al.); U.S. Pat. No. 5,331,449 (Huber et al.); U.S. Pat. No. 5,337,175 (Ohnsorge et al.) and U.S. Pat. No. 5,339,183 (Suzuki). Various forms of signal modulation are used in these systems. Laser diode signal sources are capable of providing 10 mW to 100 mW, single mode, modulated light beams at high modulation rates, typically greater than 10 MHz, with low modulated drive currents. The modulated signal can then be amplified to higher powers, most typically up to about 100 mW, via the fiber amplifier. signal can then be amplified to higher powers, most typically up to about 100 mW, via the fiber amplifier.

In U.S. Pat. No. 5,335,236 to Toeppen discloses a fiber amplifier which is injected with a seed beam and with a pulsed pump beam. The injected seed beam is generally continuous, but can instead be pulsed, provided its pulse length is greater than that of the desired output pulse. The amplifier provides a pulsed amplified output whose pulse length is determined by the pump pulse length.

A number of potential applications for fiber amplifiers, including LIDAR systems, nonlinear frequency conversion laser printing, pyrotechnic applications and material processing applications (such as material cutting or marking), require higher power levels than those normally used for fiberoptic communications. For such applications, amplified pulsed outputs with high peak powers of at least 10 W and up to 100 kW or more and with high pulse energies of at least 1 $\mu$J and up to 10 mJ or more are required for the best and most efficient operation. For example, higher frequency conversion efficiencies can be achieved in nonlinear conversion crystal devices if light input into these devices is supplied at higher peak powers with higher applied energy levels. High pulse repetition rates and high average power (on the order of 1 W or higher) are also desired. Such output pulses are usually achieved by Q-switched solid-state lasers, such as disclosed in U.S. Pat. Nos. 5,303,314 to Duling, III et al. and 5,128,800 to Zirngibl, which disclose fiber lasers that use Q-switching or gain switching mechanisms triggered by modulated or pulsed input signals to provide pulsed outputs. These types of systems, however, are large and complex. With the advent of EDFAs, attention has been directed to achieving large power and energy pulse outputs from these less complex optical amplifiers providing high power levels with high energy levels in the mJ range, such as exemplified in the article of B. Desthieux et al., "111 kW (0.5 mJ) Pulse Amplification at 1.5 $\mu$m Using a Gated Cascade of Three Erbium-Doped Fiber Amplifiers", *Applied Physics Letters*, Vol. 63(5), pp. 586–588, Aug. 2, 1993. At low input repetition rates, peak output powers of 111 kW and energies of 0.5 mJ at 1.5 $\mu$m wavelength were achieved from a multimode fiber source. Thus, to achieve higher power levels and energies with less complex systems, multiple stage fiber amplifiers can be employed.

In an amplifying medium, such as a double clad fiber amplifier, a rare-earth doped double clad fiber having a doped core, e.g., $Nd^{3+}$ or $Yb^{3+}$ is utilized. An injection source provides a signal for injection into the fiber core. Such a source is commonly a laser diode which is cost effective and most conveniently available.

Typical power levels from an injection laser diode source may be in the tens of $\mu$W to hundreds of mW. The fiber is pumped with a high power pumping source, such as an array of pump laser diodes, and its output is optically coupled into the inner cladding of the fiber. The double clad fiber amplifier output power levels can provide output power levels that reach into the 10's of kW or higher, but in order to do so, gains of 40 dB to 60 dB are required of the amplifier. However, the gain is usually limited to a range, such as between 30 dB and 40 dB, before the onset and resulting buildup of backward and forward amplified spontaneous emission (ASE), and backward Rayleigh scattering as well as other scattering noise developed in the gain medium that is scattered through out the gain medium and is propagating in the fiber core ultimately depleting the pump energy resulting in little or even no pumping power for the injection signal amplification. We collectively refer to all these types of noise hereinafter as "scattering noise". This limitation of gain, of course, limits the possibility of achieving higher peak power levels in pulsed operation of the fiber amplifier. Thus, the key to efficient amplification of the injection source signal to achieve a sufficient power and energy level is to saturate the fiber gain, minimizing the scattering noise. The problem to be solved is how this may be effectively achieved. In typical fiber amplifier configurations, the amplified backward scattering noise is the dominate loss mechanism for the pump source.

The problem of scattering noise can become more severe in cascaded, coupled fiber amplifier stages where backtraveling noise propagates from the previous stage so that it is necessary to provide a suppresser of some type between stages to reduce the amount of noise; otherwise, the achievable gain in a multistage amplifier will be limited that the amplification of the signal input will be so limited or partially nonexistent due to the amplified gain of the noise. Thus, as indicated in B. Desthieux et al., supra, in order to eliminate the noise gain, a saturable absorber is employed in the case of cw operated coupled amplifier stages. In the case of pulsed operated high power output coupled amplifier stages, a synchronously timed gate is employed between the amplifier stages to reduce the amount of possible backward and forward noise as a major contribution. The gate may take the form of an acousto-optic modulator or other modulator between the coupled amplifier stages to suppress this forward and backward traveling noise and provide more of the gain for amplification of the input signal via the initial stage amplifier. Such a gate adds significant cost to the optical amplifier system and leads to a less robust and bulkier architecture.

An object of the present invention is to provide an optical amplifier system capable of producing high peak power, high energy pulse outputs.

It is another object of this invention to provide an optical fiber amplifier system of one or more stages capable of achieving higher peak power, high energy pulse outputs by saturation of the fiber gain to minimize scattering noise.

It is a further object of this invention to provide an optical amplifier that more effectively provides for pulse outputs of higher peak power and energy without requiring any active synchronously timed gate between amplifier stages in order to reduce scattering noise, i.e., eliminates the requirement or consideration of any interstage gate or modulator.

Another object of the invention is to provide a method of operating an optical fiber amplifier in a pulsed mode that suppresses scattering noise to allow production of higher peak power, higher energy pulses.

SUMMARY OF THE INVENTION

The foregoing objects are achieved by means of two basic approaches. In a first basic approach, at least one laser diode pulsed or cw pumped double clad fiber amplifier is utilized for receiving a high frequency modulated injected signal pulse of short duration from the laser diode, via the fiber core, for amplification by means of coupled pump light into the inner cladding of the fiber. The key is that the average signal power is sufficiently maintained to saturate the gain of the fiber so as to minimize significant onset and buildup of scattering noise, such as, for example, ASE or Rayleigh scattering, traveling both back towards the fiber amplifier input and at the fiber amplifier output, or at the fiber amplifier output or backtraveling from a second or subsequent coupled fiber amplifier stage. The duty cycle of the injected signal source pulse is chosen to allow adequate gain recovery in the fiber amplifier between pulses.

A laser-injected, optical fiber amplifier device of this invention combines a pulsed laser source and a rare-earth doped, double clad fiber pumped by a high power optical pump source of at least several 100 mW average power with selected pump and injected signal pulse characteristics that provide gain for the signal pulses without the onset of scattering noise. In particular, the signal pulses injected into the fiber have power levels that are sufficient (about 1 mW average and at least 100 mW peak powers) to saturate the gain in the fiber, with a pulse repetition rate and duty cycle for the signal pulses that allow complete or partial gain recovery between pulses. For moderate to high pulse repetition rates (i.e., about 10 kHz to 1 MHz or higher), the interpulse duration is already much less than the fluorescence time constant of the active dopant ions in the optical fiber, thereby avoiding the onset of scattering noise. For lower repetition rates, the pump source for the fiber amplifier is also pulsed, with the injected signal pulses synchronized in time with the pump pulses. The pump pulse duration is less than the fluorescence time constant of the fiber dopant, for example, about 400 $\mu$sec to 10 msec or higher, so that the pump energy stored in the excited states of dopant ions provides maximum gain to the injected signal pulses rather than being depleted by the onset of scattering noise. The injected signal pulses that are amplified have pulse durations shorter than the pump beam, typically 10 nsec or less, so that the pulse energy is concentrated in very high peak power pulses of at least several watts or higher of power developed at the fiber amplifier output. Pulses of higher peak power levels, such as into the hundreds of kW, or into the tens of Isec pulse lengths can be achieved at frequencies at or above several kHz. For example, if the repetition rate of the injection pulses is faster than the time constant of the solid sate gain medium, the gain of the pulsed input is the same as the gain for a cw injection signal. For repetition rate lower than the time constant of the solid state medium, the gain between pulses can buildup to higher values than the gain for cw injection. The typical time constant of the solid state medium ranges from several 100 $\mu$sec for Nd doped fibers to 10 msec for Er doped fibers. Given this range of time constant, modulation rated over approximately 1–10 kHz will result in averaging of the gain, modulation rates lower than 1–10 kHz will result in significant gain buildup between pulses, higher than the average gain.

A second parameter that defines the operation of the system is pulse length. The pulse length may be varied between femto seconds to microseconds. LIDAR applications require operation with pulse length of approximately 10 nsec. The requirements of thermal applications such as cutting and drilling with a laser beam may be met by longer pulses, such as up to several $\mu$sec or longer. Assuming a 10 Watt average power fiber source and 10 nsec operation, the peak powers at 10 kHz and 100 kHz repetition rate are 1 kW and 100 W. For femto second pulsed operation, the peak power levels may be much higher than the nsec operation.

The laser source providing the injection pulses to be amplified may be a semiconductor laser or master oscillator power amplifier (MOPA) device. In order to achieve high pulse repetition rates, the pulsed laser or MOPA device may have a saturable absorber or an active modulator element in its resonant cavity for providing a temporally variable loss for Q-switching the laser or MOPA device. Alternatively, the pulses may be generated with pulsed electric current injection into the laser or MOPA device. Such pulsed injection may be provided to just a portion of the laser or MOPA device's gain region, while other portions of the gain region are independently pumped with nonpulsed current injection. Further, the current injection pulses may be timed to match the round-trip travel time of light in the laser cavity of the diode laser or MOPA device so as to provide mode locked operation. Direct control of pulsed operation via pulsed current injection allows for tailoring the duration and shape of the light pulse.

In another aspect of this invention, the laser source may be a laser diode source coupled to a first fiber amplifier stage, which may function, for example, as a preamplifier. Laser light amplified by the first amplifier stage is injected into a second fiber amplifier stage for further amplification from which a peak power of 10–100- kW or higher are attainable. This two-stage fiber amplification allows the first fiber amplifier to be separately pumped at a lower power level for more complete gain saturation at each stage and reduced overall affect of scattering noise. In addition, a two-stage configuration permits the insertion of other elements, such as an optical isolator, between the two fibers, which reduces the propagation of scattering noise from one fiber amplifier to the other, thereby increasing the total gain available from the two stage configuration. With the first fiber amplifier stage, laser pulses of low peak power, such as under 100 mW, can be amplified to the levels required for injection into the second fiber amplifier stage. The first fiber amplifier stage may be either a single clad or double clad fiber, and may be doped with the same or a different dopant as the second stage, double clad fiber amplifier, provided the respective dopants have overlapping gain spectra so as to provide for gain at the same wavelength.

In a second basic approach, a cascaded, multistage optical fiber amplifier comprises a first amplifying medium optically coupled to a second stage amplifying medium. Such amplifying media may be comprised of optical fiber amplifiers, solid state laser media, or other optical semiconductor amplifying waveguide media. Each amplifier stage is provided respectively with first and second pump sources having different pulse repetition rates and different pulse lengths, both of which are synchronized with the pulse repetition rate of the signal source. This pulse differential is synonymous to a time synchronous gate between the two coupled amplifier stages so that the onset and buildup of scattering in the first amplifier stage is suppressed by being gated out due to its different pump pulse length. In particular, for example, the pump pulse duration of the first stage pump source is shorter than that of the pump pulse duration of the second stage pump source so that any noise, i.e. scattering noise, developed in the second stage amplifier will be substantially suppressed from being amplified in the first stage amplifier upon feedback because of the utilization of shorter pump pulse duration in the pumping of the first stage amplifier. In other words, any amplification of this second stage noise in feedback to the first stage amplifier can only occur during the saturation of the short pump pulses provided as input in the first stage amplifier. As a result, the amount of amplified scattering noise is small compared to the case where the first stage pump pulse is either longer in duration or cw in time. Therefore, by employing this gating effect in pumping of the first stage amplifier relative to the second stage amplifier, amplified scattering noise can be significantly reduced eliminating the need for additional optical components, such as the acousto-optic gate, in multistage optical fiber amplifiers or in multistage solid state media, as the case may be.

The foregoing two stage optical amplifying medium in the form, for example, of a cascaded, two-stage fiber amplifier with a separate pump source for each fiber amplifier stage with pulses of different pulse length or duration, does require a coupling element between the two amplifier stages, i.e., coupling optics, to connect the output from the first fiber amplifier stage into the second fiber amplifier stage. However, this configuration can be further simplified by having the separate stage pump sources both coupled as input into the first amplifier stage wherein the second pump source wavelength is transparent to the absorption spectra of the first amplifier stage. Therefore, in this case, the first and second fiber amplifier stages may be merely spliced together without the need of any coupling optics. The two stage optical fiber amplifier comprises a two pump input source to the first amplifier stage together with the injected signal to be amplified wherein the two pump sources have different pulse repetition rates and pulse lengths, both of which are synchronized with the pulse repetition rate of the signal source and provide a time synchronous gate between the two coupled amplifier stages. As a result, the onset and buildup of scattering noise in the first amplifier stage is suppressed by being gated out by using different pump pulse lengths and, therefore, cannot be effectively introduced into the second amplifier stage. In particular, the pump pulse of short duration are shorter than the fluorescence time constant of the first stage fiber amplifier so that the reduced pump pulse length does not provide sufficient time for scattering noise buildup, that is, the possibility of noise onset is effectively gated out by the employment of pump pulses absorbed in the first stage amplifier of comparatively short duration. The second or longer pump pulses are transparent to the gain absorption spectra of the first stage amplifier so that they pass through the first stage fiber amplifier directly to the second stage fiber amplifier. The second pump pulses of longer duration are within the absorption spectra of the second stage fiber amplifier to deliver the required energy and resulting gain to the second stage for providing high peak power levels, such as in excess of 1 MW, with high energy levels, e.g., 10 mJ or higher.

BRIEF DESCRIPTION OF THE DRAWINGS

FIGS. 1A–1D relate to a generic schematic representation of a first basic approach of this invention. FIG. 1A is a schematic representation laser diode pumping of an optical fiber amplifier. FIG. 1B is a schematic illustration of a two stage gain medium amplifier wherein the first stage is a fiber pumping laser and the second stage is a fiber power amplifier. FIG. 1C is a schematic representation of pumping with multiple optical fiber lasers of an optical fiber amplifier. FIG. 1D is a graphic illustration of the depletion of gain due to signal amplification and its recovery in the fiber amplifier shown in FIG. 1A in a case where the signal pulse repetition is comparatively low. FIG. 1E is a graphic illustration of the case where the signal pulse repetition is comparatively high with gain recovery through maintaining average gain in the fiber amplifier shown in FIG. 1A.

FIG. 2 is a schematic side view of a laser-injected, optical fiber amplifier, as applied to a frequency doubler waveguide, comprising a first embodiment of first basic approach of this invention.

FIG. 3 is a schematic side view of respective portions of a signal injected, two-stage, optical fiber amplifier comprising a second embodiment of the first basic approach of this invention.

FIG. 4 is a cross-section of a double clad, rare-earth doped fiber amplifier that may be employed in conjunction with any of the embodiments of this invention.

FIGS. 5 is a timing diagram of optical power versus time, illustrating the pulsed pumping operation, with pulsed pump duty cycle, relative to the first embodiment shown in FIG. 2.

FIG. 6 relates to a generic schematic representation of a second basic approach of this invention.

FIG. 7 is a schematic illustration of a first embodiment of the second basic approach shown in FIG. 4.

FIG. 8 is a schematic illustration of a second embodiment of the second basic approach shown in FIG. 4.

FIG. 9 is a schematic illustration of a third embodiment of the second basic approach shown in FIG. 4.

FIG. 10 illustrates a two stage double clad amplifier in accordance with another aspect of this invention relating to coupling efficiency of the injection source with the first stage amplifier.

FIG. 11 is an end view of the input face of the first stage amplifier of FIG. 10 illustrating the overlap of the injection source beam of the fiber core.

FIG. 12 is a further embodiment of this invention comprising a first and second stage amplification system utilizing either or both of the first and second basic approaches of this invention.

FIG. 12A is a graphical representation of a power versus time or position output for the second stage amplifier array of FIG. 12.

FIG. 13 is a modified form of the first stage amplification shown in FIG. 12 approach providing for double pass amplification.

FIG. 14 is a schematic illustration of first type of multi-wavelength light source for application as a multi-wavelength pumping source for an optical a fiber amplifier system.

FIG. 15A is a schematic illustration of a second type of multi-wavelength light source for application as a multi-wavelength pumping source for an optical a fiber amplifier system.

FIG. 15B is a graphical illustration of the wavelength band produced by the multi-wavelength light sources of FIG. 15A.

FIG. 16 is a schematic illustration of a third type of multi-wavelength light source for application as a multi-wavelength pumping source for an optical a fiber amplifier system.

FIG. 17 is a schematic illustration of a multiple redundant light source for application as a pumping source for an optical a fiber amplifier system.

DETAILED DESCRIPTION OF THE PREFERRED EMBODIMENT OF THE INVENTION

Reference is now made to FIGS. 1A–1D which embody the first basic approach of this invention. FIG. 1A discloses a conventional rare-earth doped, double clad fiber amplifier 10 comprising a single mode, rare-earth doped core and a multimode inner cladding. These fiber amplifiers are doped with rare-earth ions, such as $Nd^{3+}$, $Yb^3$, $Tm^{3+}$ or $Pr^3$. The fiber amplifier is pumped by a pump source, $P_s$ having wavelength $\lambda_p$, with its input coupled to the fiber multimode inner cladding and comprises a high power laser diode or laser array that is operated cw providing a power level, for example, around 100 mW or more. An injection signal $S_1$ of wavelength $\lambda_s$, from injection signal source, $I_s$, having a predetermined high repetitive rate or frequency, such as ten's of kHz to several MHz, is provided as input into the core of amplifier 10 which may be a single mode core. High peak powers for an amplified pulse signal, $S_2$, with wavelength $\lambda_s$ at the amplifier output, such as, on the order of 100's of watts of pulse peak power to 100's of kW of pulse peak power, or even several MW of pulse peak power, if certain conditions for operation of the fiber amplifier are met. If the input pulse power and duty cycle are properly chosen for the injected pulses, $S_1$, these aforementioned high peak powers, not previously known to be possible, can be achieved if, first, the injected signal pulse power is sufficient to saturate the gain of the fiber amplifier and, second, the duty cycle of the injected pulses is chosen to allow adequate recovery of the gain in the fiber amplifier between pulses.

Pumping of the rare-earth doped, double clad fiber amplifier 10 may be also accomplished with the use of a fiber laser as illustrated in FIG. 1B. The pumping source for amplifier 10 comprises fiber laser 12 having formed fiber gratings 12A and 12B for optical feedback. Fiber laser receives a pumping signal, $\lambda_p$, from pumping source, $P_s$, via coupling lens 10L. Fiber laser 12 may be a double clad fiber with a single doped core fiber, the core being doped, for example, doped with $Nd^{3+}$, $Yb^3$, $Tm^{3+}$ or $Pr^3$, and receives power from laser diode pump source, $P_s$, through lens system 10L the pump signal $S_1$ of wavelength $\lambda_p$ which is within the absorption band of the doped fiber core. The higher power output from fiber laser 12 is provided as input to the inner cladding of rare-earth doped, double clad fiber amplifier 10 by means of being integral with the fiber, i.e., the same fiber, or are of separate fiber bodies with optical coupling provided between the fibers by means a lens similar to coupling lens 10L (not shown).

In order to obtain very high power levels from a single double clad fiber amplifier an array of pumping sources, $12_{s1}, 12_{p2}, \ldots 12_{sn}$, comprising rare-earth doped fiber lasers, may be utilized, as shown in sig. 1C. A high level of pump power is required for injecting into the inner cladding of double clad fiber amplifier 10 via lens system 10L. Given a fixed size of the inner cladding, the pump power is determined by the brightness of the pump source. A low brightness source is focused into a large area and, therefore, relatively few low brightness sources can be coupled into the inner cladding of the amplifier. An ideal pump source for the high power double clad amplifier 10 is, therefore, one or more double clad fiber amplifiers or lasers with an output wavelength at the absorption band of double clad fiber amplifier 10. An example for FIG. 1C is the pumping of a double clad Er:Yb doped fiber amplifier 10 at 1.06 $\mu$m wavelength with an array of Nd or Yb doped double clad fiber lasers $12_{s1}, 12_{s2}, \ldots 12_{sn}$, providing outputs a around 1.06 $\mu$m wavelength due to reflective gratings $14_{G1}$, $14_{G2}, \ldots 14_{Gn}$ that maintain their operation at this selected wavelength.

The gain saturation of the fiber amplifier is determined at high pulse rates, such as those in excess of tens to hundreds of kHz, by the average injection pulse power. The average injection power of the input pulses must be of sufficient pulse length or duration for efficient pulse amplification to saturate the average output power from the fiber amplifier. The pulse length may be, for example, 10 nsec or less up to about 1 msec. There must be a balance of sufficient pulse power to saturate the gain of the fiber amplifier, which minimizes the onset and buildup of scattering noise, but providing sufficient time between pulses to permit gain recovery as exemplified in FIGS. 1D and 1E by the dash line curves. Therefore, average gain is maintained in the amplifier providing for optimized efficiency in signal pulse amplification, $S_2$, with a minimal amount of generated scattering noise coupled with sufficient fiber gain recovery.

For very high repetition rates greater than 100 kHz, for example, as exemplified in FIG. 1E, the gain response is very slow as compared to recovery shown in FIG. 1D. As a result, the gain in the fiber is approximately constant and the gain for the input pulses is the same as the average gain.

For lower repetition rates less than 100 kHz, for example, as exemplified in FIG. 1D, there may be substantial ripple in the gain as a function of time. In this case, the gain recovery present at the time of the signal pulse may be substantially higher than the average gain in the case of FIG. 1E. The maximum peak gain is determined by the onset of substantial levels of scattering noise. However, since the scattering noise has less time to build up, the peak gain will be higher than the average gain.

A specific implementation of the operation of the fiber amplifier of FIG. 1A comprises a $Nd^{3+}$ doped double clad fiber amplifier pumped with a pump source, P, comprising a P6 fiber coupled, laser diode array having a wavelength, $\lambda_p$, at 804 nm–808 nm and providing gain at around 1.06 $\mu$m. The injection source, $I_s$, was a high power tunable laser diode, which is tuned to a wavelength, $\lambda_s$, of 1.06 $\mu$m. The output of the injection source, $I_s$, was modulated at a high frequency, via an acousto-optic modulator, and coupled into the single mode core of the double clad fiber amplifier. With approximately 7 W of pump power, cw, coupled into the fiber amplifier, an injected pulse signal, 150 kHz, of rectangular pulse shape with a duty cycle of 6%, 40 mW DC peak power from a laser diode was amplified to have a DC amplified output power of 29 W peak power, and a pulse energy of 15 µJ. The pulse energy can be increased at a lower injection pulse frequency as long as the peak gain between pulses does not exceed the gain levels at which scattering noise depletes the pump power. Thus, utilizing the same pumping power levels, it is possible to achieve pulses having energy levels over 100 µJ with injection pulse repetition rates between about 10 kHz to 100 kHz. To reach frequencies above several MHz, electrically pulsed DBR laser diodes or MOPA laser diodes may be employed in lieu of a laser diode and acousto-optic modulator. Such high peak powers having tremendous utility in applications of high speed printing, LIDAR and nonlinear frequency conversion where increases in input peak power somewhat proportionately to bring about higher functional efficiencies in their particular applications. This important utility of this invention is worth repeating. For example, the efficiency of frequency conversion, such as in the case of frequency doubling, in a given nonlinear frequency converter increases as the available pulse peak power increases.

Thus, key in the operation of such double clad fiber amplifiers according to this invention is the fact that high peak injection powers from such high power laser diode injection signal sources allow higher peak power pulses to be generated as output from double clad fiber amplifiers by reducing the duty cycle of the injection signal pulses and, concurrently, concentrating the high input pulse energy into pulses having shorter durations or pulse lengths within the given duty cycle. In this case, subnanosecond to subpicosecond laser diode pulse having comparatively high peak powers can be obtained by gain switching or mode-locking techniques via injection current modulation or by incorporation of saturable absorbers into the laser diode structure.

Reference is now made to FIG. 2, which illustrates in more detail, the pumped optical amplifier medium of this first basic approach of the invention. In FIG. 2, a laser injection source 11 emits coherent light pulses at a wavelength $\lambda_s$, which are injected into an optical fiber amplifier 13 to develop high peak powers and pulse energy levels. The amplified pulses emitted from fiber amplifier 13 may be used for any of a number of possible applications, including nonlinear frequency conversion, laser printing and LIDAR (light detection and ranging). In FIG. 2, a second harmonic generator (i.e., frequency doubler) 15 in the form of a nonlinear crystal is illustrated as an application, and receives the amplified pulses from amplifier 13 at wavelength $\lambda_s$ and efficiently produces pulses at a converted wavelength (½·$\lambda_s$). The conversion efficiency in such doubler crystals 15 and other nonlinear devices is directly related to the instantaneous optical intensity which is coupled into those devices, and thus depends on the peak pulse power levels achievable by fiber amplifier 13. Collimating and focusing optics 39 couple the light between the several consecutive stages 11, 13 and 15. Such optics 39 may include any convenient combination of lenses and optical fiber waveguides as is conventional in the art. Alternatively, multi-coupling may be employed between the laser diode fiber and the nonlinear crystal.

The laser source 11 comprises a semiconductor laser diode 21 or a semiconductor MOPA device. A laser modulator with an external modulator, a DBR laser or MOPA with DBR oscillator may comprise source 11 because they exhibit reduced chirp under pulsed conditions and thus emit light of a single (narrow band) stable frequency or wavelength even at high pulse repetition rates, such as in excess of 1 MHz, to peak power levels of at least several 100 mW. The laser diode may employ an unstable resonator geometry with a flared gain region for generating higher output power while preserving single spatial mode emission. Such a MOPA type of device is preferably constructed with a flared amplifier section coupled to a single mode laser oscillator section and possibly an optional single mode preamplifier section, a saturable absorber, or a modulator element. As to MOPA structures, preamplifier sections, a saturable absorbers, and a modulator elements, U.S. Pat. No. 5,392,308, assigned to the assignee herein, and U.S. Pat. No. 5,175,643, assigned to Xerox Corporation, are incorporated herein by reference.

The fiber amplifier 13 comprises a rare-earth doped optical fiber 23 and a high power optical pump source 25. A dichroic beamsplitter 27 or other beam combining element, such as a fiber coupler, is employed to optically merge the pump light of wavelength $\lambda_p$ with the input pulses of wavelength $\lambda_s$ from injection signal source 11. The rare-earth dopant for the fiber 23 may be any of those conventionally employed in fiber amplifiers and lasers to achieve gain via stimulated emission, including neodymium ($Nd^{3+}$), ytterbium ($Yb^{3+}$), erbium ($Er^{3+}$), thullium ($Tm^{3+}$), holmium ($Ho^{3+}$), and a combination of erbium and ytterbium ($Er^{3+}$:$Yb^{3+}$). The wavelength $\lambda_s$ of the input pulses from the laser source 11 is selected to match the gain band of the particular active dopant. For neodymium, this is most commonly about 1.06 µm, but also 0.90 µm to 0.95 µm; for ytterbium, from 1.03 to 1.14 µm and also from 1.26 to 1.34 µm; for erbium or Er:Yb, about 1.54 µm; for thullium, about 1.7 µm or 2.0 µm; and for holmium, about 2.1 µm. The pump wavelength $\lambda_p$ is likewise selected to match the absorption wavelength band for the particular dopant employed in the fiber amplifier. There is usually some variability in these wavelength bands depending on the glass fiber core material selected to serve as the host for the dopant. Usually, a silica glass is employed.

The fiber 23 is preferably a double clad fiber with a central core 29 of a first refractive index that is doped with the rare-earth active ions, a first inner cladding 31 of a second, lower refractive index surrounding the core 29 and a second outer cladding 33 of a third, further lower, refractive index surrounding inner cladding 31. In this type of fiber, the core functions as a waveguide and amplifying medium for the input pulses, while the inner cladding functions as a waveguide for the pump light. A cross-section of one such suitable double clad fiber is illustrated in FIG. 4. Core 40 preferably has a diameter of less than about 10 µm and supports propagation of only a single spatial mode of the light. However, it might instead be a larger multimode core, if desired. It may have a circular cross-section, as shown, or have some other shape, such as rectangular or elliptical, for polarization preservation. Inner cladding 42 is typically a multimode waveguide and has a size and shape selected to match that of the pump light received from pump source 25 for maximum coupling efficiency. A rectangular shape, as shown, is typical, although an elliptical or any other shape might also be used. Outer cladding 44 serves to confine the pump light to core and inner cladding regions 40 and 42.

As seen in FIG. 2, fiber end surfaces 30 and 32 may be polished at a slight 12° to 15° angle from the fiber normal to minimize reflective feedback of the light propagating in the fiber. The fiber ends may also be antireflection coated.

Pump source 25 is preferably a high power, high brightness, fiber coupled, laser diode array. The laser diode array is fiber coupled to end surface 30 and consists of multiple semiconductor laser diodes to provide for redundancy to improve the reliability of the source and the system. Pump source 25 may also be a MOPA or a doped single clad fiber pump source. The provided output power should be at least several 100 mW, and preferably 10 W–20 W or higher, average output power in a continuous, quasi-continuous or pulsed mode. For pumping neodymium-doped fiber amplifiers, commercially available GaAlAs monolithic linear laser arrays emitting pump light in the 798–810 nm range include the 3400 series (continuous) and 3200 series (quasi-cw) from SDL, Inc., of San Jose, Calif. For example, the SDL-3450-P5 provides 10 W of continuous output from a 400 $\mu$m diameter, 0.4 NA fiber bundle. The SDL-3251 bars provide 100 W peak quasi-cw output from a 10 mm by 1 $\mu$m emitting aperture (10 by 30 FWHM beam divergence) for a 400 $\mu$sec maximum pulse width (40 mJ/pulse) and a duty factor of up to 40% (4 W average power). For pumping ytterbium or erbium doped fiber amplifiers, commercially available InGaAs monolithic linear laser arrays emitting pump light in the 960–980 nm range include the SDL-6480-P5 fiber-coupled laser with 10 W cw output like the SDL-3450-P5 laser mentioned above and the SDL-6231 laser bars providing 60 W peak quasi-cw output from a 10 mm by 1 $\mu$m emitting aperture (10 by 40 FWHM beam divergence) for a 400 $\mu$sec maximum pulse width (24 mJ/pulse) and a duty factor of 2 to 3% (1.2 to 1.8 W average power). Stacked arrays with even greater quasi-cw outputs are also available. InGaAsP/InP lasers can produce pump light for longer wavelength thullium and holmium fiber amplifiers.

The pump light from laser pump source 25 is coupled via the dichroic beamsplitter 27 and a focusing lens 39 into inner cladding 31 of optical fiber 23 and is absorbed by dopant ions in fiber core 29 as it propagates down the length of the fiber to create gain for the light pulses from injection signal source 11.

Pulsed operation of the laser diode or MOPA device 21 of injection signal source 11 may be achieved by pulsing the electric current I(t) injected into device 21. Preferably, the pulsed injection current I(t) is supplied only to a portion of the device, such as to a single mode waveguide section, while other portions, including any flared gain section, are pumped independently with DC current. For example, pulsed current may be supplied to a MOPA device's oscillator or preamplifier section, while DC current, not necessarily uniformly distributed, may be injected into the MOPA's flared amplifier section. The result of this pulsed current injection I(t) is a pulsed optical output from the device 21 whose pulse characteristics correspond to the current pulses. It is thus possible to tailor the optical pulse duration and shape by tailoring the injection current pulses.

Pulse shaping is important for certain applications and, for example, optical parametric oscillators (OPO) or optical parametric amplifiers, where the conversion efficiency strongly depends on input power. In these types of situations, a pulse with a slow buildup or rise time will result in low efficiency. Alternatively, pulsed operation may be achieved by using Q-switching or mode locking techniques to produce subnanosecond (or even subpicosecond) pulses. The laser source 11 may incorporate an active electro-optic or magneto-optic modulated loss element in the laser cavity, or a passive cavity loss element, such as a saturable absorber in the laser diode structure, to induce Q-switching. The injection current may be modulated at a rate timed to match the round trip travel time of the cavity to induce mode locking. A combination of mode locked operation and a Q-switch element to the repetition rate of the mode locked pulses may be used.

The characteristics of the optical pulses emitted from the laser source 11 typically include a sub kHz–100 MHz repetition rate for a 1 nsec to several msec time period between successive pulses, a duty cycle of 10% or less for pulse lengths of 10 nsec or less, peak power levels of from 100 mW to 1 W or more, pulse energies of about 1 nJ to 0.1 $\mu$J per pulse, and average power on the order of 1 mW. It is important for minimizing scattering noise to inject sufficient optical power from the laser source 11 into the fiber amplifier 13 to saturate the gain of the fiber medium. At high modulation rates, the gain saturation for a given fiber amplifier 13 is largely determined by the average power of the laser source. In a typical optical fiber, about 30–40 dB gain can be achieved before the onset of scattering noise. Therefore, in order to obtain several watts of average output power, the received input power to the fiber amplifier 13 is 1 mW or higher to achieve gain saturation. In the case of multistage fiber amplifiers, however, operation with over 50 dB gain is achievable so that even lower injection source powers are all that is necessary to provide sufficient output power for desired applications.

The repetition rate of the pump power from pump source 25 is chosen to allow time for adequate gain recovery in the fiber amplifier 13 between pulses. The duty cycle relates to the peak power of the amplified pulses from injection signal source 11. A low duty cycle concentrates the pulse energy into a shorter duration for higher peak power levels.

The amplified output pulses of wavelength $\lambda_s$ emitted from output surface 32 of fiber 23 may be coupled into an optically nonlinear frequency conversion element, such as a frequency doubler 15. The frequency doubler 15 may comprise a bulk $KNbO_3$ crystal 35 with a QPM waveguide 37. As an example, waveguide 37 may be periodically poled with alternating ferroelectric polarization domains (+and −) to maintain phase matching of the amplifier output of wavelength $\lambda_s$ injected into the waveguide with the converted light of wavelength ($\frac{1}{2}\cdot\lambda_s$) generated in the waveguide by the nonlinear second harmonic generation process. Light pulses received from a neodymium fiber amplifier with wavelength in a range from 900 nm to 950 nm are converted to pulsed blue light with a wavelength ranging from 450 nm to 475 nm. Likewise, green light pulses of from 515 nm to 570 nm wavelength can be generated from the 1030 nm to 1140 nm pulsed output from a praseodymium fiber amplifier or the 1060 nm pulsed output of a neodymium fiber amplifier.

The efficiency of the second harmonic generation process is related to the optical power density of the light pulses coupled into the nonlinear waveguide. In particular, since frequency doubling is driven by the instantaneous intensity, the high peak power levels from a pulsed fiber amplifier convert much more efficiently than continuous, but lower power outputs. In other words, the high peak power levels achievable through the utility of this invention, e.g., 1 to 10 kW or higher, permit higher efficient doubling in bulk crystals, which is an important attribute of this invention relative to applications requiring high power inputs for greater efficiency in operation. Conversion efficiency also depends upon the wavelength and polarization stability of the amplified light pulses. A single narrow wavelength band is preferred, since linewidth broadening and chirp reduce doubling efficiency. Accordingly, injection signal source 11 may be a DBR laser or other stable wavelength sources to stabilize the amplification wavelength including a laser diode source stabilized by external grating feedback or a laser diode with external modulation. Likewise, single polarization from fiber amplifier 13 is also preferred. This may be achieved with a combination of a stable input polarization from injection signal source 11, a polarization preserving fiber 23, or a fiber polarization controller near output end 32 of optical fiber 23, such as a mechanism for stressing the fiber, with a feedback control loop sensing the output polarization. A polarizing filter might also be place between fiber output at face 32 and the input to waveguide 37.

In addition to second harmonic generation, i.e. frequency doubling, other single pass processes, including sum frequency generation and difference frequency generation, are also more efficient with high peak power pulses. Further, resonant frequency conversion processes, such as optical parametric oscillation (OPO), may be used with the pulsed fiber amplifier outputs to efficiently convert the light to mid-infrared wavelengths. LIDAR systems make use of multi-watt peak power pulses in excess of 1 μJ/pulse energies in the near to mid infrared range. Thus, the pulses directly from the fiber or generated by OPO-converted fiber amplifier outputs can be used in such LIDAR systems.

FIG. 3, which is divided into FIGS. 3A and 3B, is another embodiment in accordance with the basic first approach. With reference to FIG. 3A, there is shown a cascaded or multi-stage fiber amplifier comprising a first amplifier source 51 having a injection signal source 51a to be amplified, which may be a laser diode, and a first pumped fiber amplifier 51b optically coupled to a second pumped fiber amplifier 53. Injection signal source 51a is similar to source 11 in FIG. 3A so that laser diode 61 may be the same as laser diode 21 in FIG. 2. Laser 61 may be operated in a pulsed mode via a pulsed current injection signal I(t) as in the case of laser 21. First fiber amplifier 51b amplifies the injection signal pulses to kilowatt peak power levels for injection into second fiber amplifier 53 which provides further amplification of the amplified signal to megawatt peak power levels. Alternatively, a low power laser diode may be employed for injection signal source 51a providing pulses of about 100 mW peak power or less. The lower power helps to maintain single frequency operation without chirping, which results in single frequency, amplified outputs. First fiber amplifier 51b amplifies the signal pulses to a range of about 1 W to 10 W peak power levels. First fiber amplifier 51b also makes possible the use of input pulses of more moderate repetition rates (under 1 MHz) and larger duty cycles (about 1–10%) while still providing the 1 W to 10 W peak power pulses to second fiber amplifier 53 required for amplification to 10 kW to 100 kW peak levels.

While pulse durations of 10 nsec or less are usually preferred, there may be some applications where longer pulses of up to 1 μsec duration are desired for greater pulse energies. In such instances, the pulses may be generated either by direct current injection I(t), as before, or by an external modulator.

First fiber amplifier 51b comprises a rare-earth doped fiber 63 and a laser diode pump source 65. Fiber 63 may be a double clad fiber, like fibers 23 and 73, or can be a conventional single-clad fiber, as shown here. Light pulses at the amplification wavelengths $\lambda_s$ from laser diode 61 and pump light at pump wavelength $\lambda_p$ from pump source 65 are combined, via a dichroic beamsplitter 67 or other beam combining optics, and injected into core 69 of fiber 63. Input and output end surfaces or faces 70 and 72 may be polished at an angle, antireflection coated or both to minimize reflective feedback in fiber 63.

Second fiber amplifier 53 in FIG. 3B is similar to amplifier 13 of FIG. 2, having a double-clad fiber 73 and a high power laser diode pump source 75. A dichroic beamsplitter 77 combines the pump light of wavelength $\lambda_p$ with the light pulses of wavelength $\lambda_s$ to be amplified received from source 51. The light pulses to be amplified are coupled into a rare-earth doped core 79 of fiber 73, while the pump light is coupled into the inner cladding 81 surrounding core 79. A second or outer cladding 83 confines the pump light to core and inner cladding regions 79 and 81. The fiber input and output surfaces or faces 80 and 82 may be polished at an angle, anti-reflection coated, or both to minimize reflective feedback within optical fiber 73.

The rare-earth dopant for first fiber amplifier 51b need not be same as the dopant in second fiber amplifier 53, provided that the dopants employed in both first and second fiber amplifiers 51 and 53 provide gain at the same wavelength $\lambda_s$ from injection signal source 61. As an example, the dopants, neodymium and yt-terbium, have overlapping gain spectra at 1.06 μm. Likewise, the pump wavelengths $\lambda_p$ from pump sources 65 and 75 need not be identical, provided both wavelengths fall within the corresponding pump absorption wavelength band or bands for first and second amplifiers 51b and 53. For example, a ytterbium doped, first fiber amplifier 51b may be pumped at about 970 nm while a neodymium doped, second fiber amplifier 53 may be pumped at about 808 nm. Finally, the average pump power levels for pump sources 65 and 75 will, in general, not be identical. Rather, pump source 65 for first fiber amplifier 51b should have a lower average power than pump source 75 for second fiber amplifier 53 because first fiber amplifier stage 51b need only be pumped to provide a much lower average output power than second fiber amplifier stage 53. This will allow first fiber amplifier 51b to be saturated by the light pulses from source 51a minimizing the potential influence of scattering noise. The pulses are amplified to higher average and peak power levels in first fiber amplifier 51b, and the amplified pulses are injected into second fiber amplifier 53 for further amplification. The higher power levels of the preamplified pulses allow second amplifier 53 to be pumped by pump source 75 to higher levels while still maintaining saturation minimizing the potential influence of scattering noise. Both first and second pump sources 65 and 75 may be linear laser diode arrays or flared amplifier, semiconductor MOPA devices. Second pump 75 for second fiber amplifier 53 may, alternatively, be a stacked laser array. All of the elements in the cascaded fiber amplifier system of FIG. 3 are optically coupled to one another by collimating and focusing optics 89, typically in the form of lenses, but may also be coupled via optical fibers.

With respect to the embodiment of FIG. 3, in addition to saturating the inputs to the fiber amplifiers, scattering noise can also be minimized with a proper choice of pulse repetition rate for the input pulses or with a pumping technique in a cascaded amplifier configuration by means of gain switching. The rare-earth dopant in the fiber core of these amplifiers typically have fluorescence time constants in a range from about 400 μsec to 700 μsec, which is directly associated with the onset of scattering noise. Accordingly, if the pump power were held substantially constant at about 1 W to 10 W cw, then the input pulse repetition rate of the injection signal I(t) must be selected to be sufficiently high so that the interpulse duration is not greater than the fluorescence time constant. This limits the gain to about 30 dB or 40 dB before the onset of scattering noise, so that a pulsed injection of 1 W peak power is amplified to just 1 kW to 10 kW peak power. FIG. 5 shows a timing diagram for one duty cycle of the injected signal input (A) and pump pulse (B) relative to the fiber amplifier of FIG. 3, providing amplified output pulse (C), when the amplifier is operated with a pulsed pump source. Instead of being continuous, the pump source is pulsed so as not to be continuous during the complete duty cycle. Pump pulses 41 have a duration of from 10 μsec to 500 μsec, which is sufficiently short to avoid the onset of scattering noise. The 0.1 mJ to 5.0 mJ of pump energy supplied by a pump pulse with 10 W to 20 W peak power is stored in the excited states of the dopant ions until released by stimulated emission from injection of an input pulse 43 into the fiber amplifier shortly before the end of the pump pulse at time $t_0$. Input pulse 43 typically has a peak power of about 1 W and a pulse duration of about 10 nsec, although shorter pulses with higher peak power levels are also possible. The stored energy in the fiber amplifier is converted into an output pulse 45 of approximately the same pulse duration as input pulse 43. In this manner, 10 nsec output pulses 45 having about 10 kW to 100 kW peak power are achieved without the buildup of scattering noise.

Reference is now made to FIG. 6 illustrating a second basic approach of this invention. As previously mentioned in connection with the article of B. Desthieux et al., when employing cascaded optical amplifiers, such as two laser optical fiber amplifiers connected in tandem, a buildup of scattering noise can occur from saturating the amplifier, particularly in cases where large gains are required. Such saturation can occur, for example, with gains at 30 dB or above. The back-traveling noise from the second amplifier is coupled back into the first amplifier, where it is amplified, saturating the first amplifier. The noise may be amplified to such a great extent that amplification of the desired signal cannot be effectively achieved. Desthieux et al. suppresses this problem by utilizing a synchronously timed gate between the coupled tandem amplifiers in the form of an acousto-optic modulator that shuts off the backtraveling noise during a portion of the duty cycle of the first amplifier. However, instead of employing such an active modulated element, the same affect can be achieved, without the need of any interstage coupled device, by modulating the first and second pump signals of a two stage amplifier to have two different duty cycles.

As seen in FIG. 6, a first pump signal 92 is provided as input to a first amplifying medium 94, along with the injected signal 90 to be amplified, having a first duty cycle 96. The amplified injected signal 90' from the first amplifier medium 94 is supplied as input to a second amplifying medium 102 along with a second pump signal 100 having a second duty cycle 104. A characteristic of the first and second duty cycles 94 and 104 is that the pulse length or duration 98 of the first duty cycle 96 is shorter than the pulse length or duration 106 of the second duty cycle 104. Since the first duty cycle pulse duration 98 is so much shorter in time compared to the second duty cycle pulse duration, the backtraveling scattering noise from the second amplifying medium 102 is reduced to a very short time period for any possible amplification in the first amplifying medium 94 so that saturation in the first amplifier medium 94 is not substantially consumed through amplification of such scattering noise. As a result, much higher levels of output powers and energies can be achieved at the output of second amplifying medium 102 than previously achieved, including that achievable by B. Desthieux et al., supra.

It should be noted that since a large portion of the scattering noise is due to the backtraveling scattering noise of both ASE and Rayleigh scattering, the shorter pulse length or duration 98 is preferably in the first duty cycle 96 rather than in the second duty cycle 104. However, the pulse durations 98 and 106 may also be of the same length. Moreover, the inventive concept is still operative when the pulse length or duration 106 in second duty cycle 104 is shorter than pulse length or duration 98 in the second duty cycle 96 to reduce scattering noise, in particular, with respect to forward scattering noise. The important point in conjunction with each of these three pulse duration relationships between the first and second pump pulses is to ensure that the injection pulse receives the available gain of the amplifying medium.

Relative to synchronization of the pump pulses with the injection pulse, the pulse relationship may be a constant time relationship or vary with time. In either case, the synchronization needs to be maintained so that the injection pulses 90 and 90' occur in proximity to the terminal end of respective pump pulses 92 and 100 thereby assuring optimum available gain buildup in medium 94 or 102. therefore, the injection pulses can be synchronized to be overlapped or immediately adjacent to on either positional side of the terminal end of the pump pulse.

Lastly, for certain applications, one pump output may be cw and the other pump output may be pulsed. As a specific example for cases requiring high power amplification in the FIG. 6 configuration, pump 92 may be pulsed while pump 100 may be operated cw.

FIG. 7 illustrates a first embodiment for accomplishing the amplifier operational scheme of FIG. 6. First amplifying medium 94 comprises an optical fiber amplifier $A_1$, e.g., an erbium doped fiber amplifier (EDFA). Injection signal, $\lambda_s$, from injection signal source $I_s$ via optical coupling 90, together with first pump signal, $\lambda_{p1}$, from pump source $P_1$ via optical coupling 92 and beam splitter $BS_1$, are provided as input to first optical fiber amplifier $A_1$. The output from amplifier $A_1$ is coupled, via standard coupling optics, to an optical input to second amplifying medium 102 comprising optical fiber amplifier $A_2$, e.g., an erbium doped fiber amplifier (EDFA), via coupling optics (conventional collimating and focusing lens system), together with second pump signal, $\lambda_{p2}$, from pump source $P_2$ via optical coupling 100 and beam splitter $BS_2$. Any scattering noise, including backtraveling noise from amplifier $A_2$ into amplifier $A_1$, is not available for saturating amplifier $A_1$ during the duty cycle of the first pump signal 92 except during the relatively short pulse duration 98 when the latter pump signal is active during its is cycle, which is a comparatively short period of time relative to its total cycle time 96.

In the embodiment of FIG. 7, the amplification of scattering noise is suppressed by gain switched pumping of the first stage amplifying medium, $A_1$, with short, several msec long, high power pump pulses having a duration much shorter, such as between 10 μsec and 500 μsec, than the fluorescence time constant of the amplifying medium, which constant is generally in the range of about 400 msec to 700 msec (for $Nd^{3+}$ it is about 400 μsec) and is associated with the buildup of the scattering noise. The second stage amplifying medium, $A_2$, is pumped with a longer pulse length, such as around 500 msec or higher, in order to deliver the required energy to the second stage amplifier to provide very high energy output pulses of 10 mJ or more. Instead of a multimode inner cladding, double clad fiber for the second stage power amplifier, the amplifier may be a multimode core, double clad fiber or a multimode, single clad fiber to support even higher peak powers. Because the shorter pump pulse lengths are employed in the first stage amplifying medium, the scattering noise in the first amplifier is effectively gated out, while being synchronous with the input of the cw or pulse injection signal to be amplified without the necessity of any active modulator between the two amplifying media 94 and 102. By reducing the pump pulse duration in the first amplifier, the possible buildup time for the scattering noise is significantly reduced and the SNR of the pulse output is improved. The necessity or requirement of an isolator or other noise suppresser between amplifiers $A_1$ and $A_2$ is substantially eliminated.

An example of parameters for the embodiment shown in FIG. 7 is as follows. The first stage amplifier, $A_1$, may be pumped with a 100 W pulse having a 4 μsec pulse length, which corresponds to a pump pulse energy of 0.4 mJ. The signal pulse to the first stage amplifier may be a 10 nsec pulse having a peak power of 1 W. This is sufficient for 1.0 mJ pulse energy from the first stage amplifier achieving an amplified peak power output from this stage of about 10 kW. The second stage amplifier, $A_2$, may be pumped with a 100 W pulse having a 500 μsec pulse length, which corresponds to a pump pulse energy of 50 mJ. This is sufficient for tens of mJ pulse energy from the second stage amplifier achieving an amplified peak power output from this stage of about 1 MW.

FIG. 8 illustrates a second embodiment for accomplishing the amplifier operational scheme of FIG. 6. The second embodiment has an advantage over the first embodiment in being more compact and requiring less components, in particular, eliminating the need for the coupling optics, such as shown in FIG. 7 between the first and second amplifying media, $A_1$, $A_2$. Rather, the two fiber amplifiers $A_1$ and $A_2$ may be merely spiced together. First amplifier medium 94 comprises an optical fiber amplifier $A_1$, e.g., an ytterbium (Yb) doped, double clad fiber amplifier (YDFA). Injection signal, $\lambda_s$, from injection signal source $I_s$, together with both first pump signal, $\lambda_{p1}$, from pump source $P_1$ and second pump signal, $\lambda_{p2}$, from pump source $P_2$, via optical couplings 90, 92, 100 and beam splitter, BS, are all provided as input to first amplifier medium 94 which comprises an optical fiber amplifier $A_1$. Second amplifier medium 102 comprises an optical fiber amplifier $A_2$, doped with a different dopant from that of amplifier $A_1$, e.g., an neodymium (Nd) doped, double clad fiber amplifier (NDFA). The wavelength of the second pump signal, $\lambda_{p2}$, is chosen such that it is transparent to the absorption spectra of amplifier $A_1$. As a result, second pump signal, $\lambda_{p2}$, passes through amplifier $A_1$ without any affect but, upon reaching second amplifier $A_2$, is effective to be absorbed and provide gain to the amplified injected signal 90' (FIG. 6) as the latter traverses through the second amplifier $A_2$. Any scattering noise, including backtraveling noise from amplifier $A_2$ into amplifier $A_1$, is not available for saturating amplifier $A_1$ during the duty cycle of the first pump signal, $\lambda_{p1}$, except during the time of the relatively short duration 98 when the latter pump signal is active, which time duration is a comparatively short period of time relative to total cycle time 96. Moreover, a portion of the backtraveling noise from amplifier $A_2$ into amplifier $A_1$ is likely not to even be within the absorption spectra of amplifier $A_1$.

In operation, the two laser diode sources $P_1$ and $P_2$ provide respective wavelengths at approximately $\lambda_{p1}=920$ nm or 980 nm for absorption in Yb doped amplifier $A_1$ and at approximately $\lambda_{p2}=808$ nm for absorption in Nd doped amplifier $A_2$, which are both injected into the front end of inner cladding of YDFA, $A_1$, along with the injection signal, $\lambda_s$, such as at approximately 1.09 μm, at cw with a power level of 100 mW or, for more input power for saturation, pulsed at 10 nsec to 100 nsec with peak powers around 500 mW. The 920 nm pump light is provided with a duty cycle that is less than 5% with pulses of short duration or pulse length in order to suppress the buildup of scattering noise. This 920 nm pump beam is absorbed in YDFA, $A_1$. The 808 nm pump light is provided with a duty cycle that is greater than 20% with pulses of longer duration or pulse length, and travels through first YDFA, $A_1$, without absorption, i.e., is transparent to any absorption properties, but is absorbed in second NDFA, $A_2$. The 808 nm pump light is operated at a longer pulse length so as to provide high pulse energy. Since the pulse duration for the 920 nm pump beam is comparative very much shorter in time, the backtraveling scattering noise from second amplifying medium $A_2$ is reduced to a very short time period for any possible amplification in first amplifying medium $A_1$ so that saturation in the first amplifying medium is not consumed through amplification of the noise. As a result, much higher levels of output pulse powers and energies can be achieved at the output of second amplifying medium $A_2$ by using pulse lengths comparatively much longer in duration compared to that for the first amplifying medium $A_1$. With this pulsed operation, the coupling optics between amplifiers $A_1$ and $A_2$ can be eliminated and the amplifiers can be spliced together or actually be a single fiber with two different sections with different rare-earth doping, which is discussed in further detail later relative to FIG. 7.

With respect to the embodiment shown in FIG. 8, two separate pump sources, $P_1$, $P_2$, are shown. However, these pump sources can be integrated into a single pump source comprising a single laser diode bar wherein a first portion of the bar comprises a plurality of laser stripes operating, as fabricated or as tuned, at the first pumping wavelength, $\lambda_{p1}$, such as 920 nm, and a second portion of the bar comprises a plurality of laser stripes operating, as fabricated or tuned, at the second pumping wavelength, $\lambda_{p2}$, such as 808 nm. The respective laser strip outputs are directly coupled to respective input ends of optical fibers which are bundled into a composite group with their bundled output focused into the inner cladding of the first amplifying medium $A_1$ so that light of both wavelengths $\lambda_{p1}$, $\lambda_{p2}$ are optically coupled in the inner cladding of the fiber.

In the embodiment shown in FIG. 9, the configuration is the same as that shown in FIG. 7, except that two separate or independent injection signal sources, $I_{s1}$ and $I_{s2}$, to be amplified and are provided as input to the first amplifying medium $A_1$ for signal amplification Signal wavelengths, $\lambda_{s1}$ and $\lambda_{s2}$, are both within the gain bandwidth of amplifiers $A_1$ and $A_2$. As in the case of FIG. 7, the shorter pump pulse lengths are employed in the first stage amplifying medium so that the scattering noise in the first amplifier is effectively gated out while being synchronous with the input of the cw or pulse injection signal to be amplified, without the necessity of any active modulator between the two amplifying media. By reducing the pump pulse duration in the first amplifier, the possible buildup time for the scattering noise is materially reduced and the SNR of the pulse output is improved.

While the foregoing second basic approach, as embodied in FIGS. 7–9 has been explained relative to the employment of two amplifying media, which may respectively have the same or different wavelength absorption spectra, it would be understood by those skilled in the art that, in reality, the cascaded amplifying media can be within a single fiber. In this case, with particular emphasis relative to FIG. 7, the length of the single fiber is optimized so as to absorb most of the pump light relative to approximately half of the fiber length. The shorter pump light pulses would be applied to the front end of the amplifying medium along with the injection source light, and the longer pump light pulses would be applied to the back end of the amplifying medium. With particular emphasis relative to FIG. 8, the length of the single fiber is optimized so that a smaller portion of the fiber is doped with a first rare-earth ion species and a second larger portion with a second rare-earth ion species. The shorter pump light pulses would be applied to the front end of the amplifying medium along with the injection source light, and the longer pump light pulses would be applied either through the front or to the back end of the dual-doped amplifying medium.

Also, while the medium examples shown for the embodiments for FIGS. 7–9 are optical fiber amplifiers, they could be other solid state media, such as solid state rods or doped optical waveguides.

With respect to the foregoing embodiments relative to each of the described basic approaches, the need for efficient coupling to the first amplifying stage may not be a requirement or a necessity due to the obtaining of sufficiently high output power from the multistage fiber amplifiers. As a result, alignment of the injection signal and pump source outputs on the fiber end input of the first amplifying stage is not critical so that alignment tolerances of these optical components are eased and optical feedback into the sources themselves is reduced. FIGS. 10 and 11 aid in the explanation of this coupling approach.

FIG. 10 discloses two optically coupled double clad fiber amplifiers $A_1$ and $A_2$ having rare-earth doped inner claddings with laser diode source, $I_s$, having a wavelength, $\lambda_{s1}$, that matches the gain bandwidth of both rare-earth doped fiber amplifiers 94 and 102. As an example, for a Yb doped fiber, the optimal injection wavelength, $\lambda_{s1}$, is around 1100 nm. Respective pump sources $P_1$ and $P_2$ provide pumping wavelengths $\lambda_{p1}$ and $\lambda_{p2}$ at the absorption peak, via beam splitters $B_{S1}$ and $B_{S2}$, to amplifiers 94 and 102. If desired, such as in cases of cw operation of the amplifier system, an optical isolator 104 may be inserted between amplifiers $A_1$ and $A_2$. Basically, the configuration of FIG. 10 is substantially the same as the configuration of the invention shown in FIG. 3A, 3B.

The light beam from a substantially single spatial mode laser diode source, $I_s$, is imaged, via a focusing lens, for example, onto the input face of the core of first stage amplifier 94 for signal amplification along the length of its fiber 110. The input coupling into the double clad fiber of the first stage is shown in FIG. 11 wherein fiber 110 has a core 112 and inner cladding 114 and outer cladding 116. As shown in FIG. 11, the injection source light beam, $\lambda_s$, substantially overlaps the diametrical size of core 112 so that there is low coupling efficiency of the total power of the pump source into core 112. The input of the pump source beam, $\lambda_{p1}$, is a much broader image but is not filling or complete overlapping the diametrical extent of inner cladding 114.

A typical single mode diode source would be capable of providing an output power of over 100 mW. However, since the gain of the two stage amplifiers $A_1$ and $A_2$ is capable of delivering high power outputs more than adequate for many applications, much less power levels are needed for signal injection into the fiber core for amplifier $A_1$ for amplification. Therefore, the coupling efficiency of the light from source, $I_s$, into the amplifier core may be only of a small amount, e.g., less than a mW of power, since the power out of the two stage amplifier will be still sufficient for desired applications. The low coupling efficiency reduces both the necessity of exacting alignment tolerances between the laser source output and the input face of the amplifier fiber and the optical feedback from the fiber amplifier back into the laser diode source. If necessary, an optical isolator may be inserted in the optical path between laser diode source, $I_s$, and fiber amplifier $A_1$ to further reduce optical feedback from amplifier $A_1$. The optical isolator may be a neutral density filter if the optical losses associated with such devices can be tolerated for the particular application of the dual amplifier system.

First amplifier $A_1$ may be designated as a pre-amplifier which amplifies the injection source, $I_s$, for a sub mW level, due to low coupling efficiency as explained above, up to power output levels of hundreds of mW from this first stage 94 with a typical gain of about 30 dB. The first amplifier $A_1$ may be pumped via source, $P_1$, with a single broad area laser diode with an output power in the range of 0.5 W to 2 W. The employment of a higher pump power will result in a higher gain and an improved noise figure. Alternatively, the first fiber amplifier $A_1$ may be a single clad fiber pumped with a single mode laser gain matched to the core of the amplifier fiber. The single mode fiber will have a higher efficiency and improved noise figure. However, in this case, the output power from the first fiber amplifier stage will be more limited because of the lower power provided by a spatially coherent pump laser diode as compared to a broad area pump laser diode employed for pumping a double clad fiber configuration, as shown in FIG. 10, via the inner claddings.

Light emitted from the first stage amplifier 94 is passed through optical isolator 104 and injected into second stage amplifier 102. Second stage fiber amplifier 102 operates as a power amplifier to amplify the injection signal to a high power level. The high injection power injected into amplifier 102 permits saturation of the output power at relatively low gains in the range of about 10 dB to 20 dB.

Particularly with cw operation of this two stage amplifier system, optical isolator between first and second stage amplifiers 94 and 102 prevents any buildup of amplified scattering noise, in particular backtraveling scattering noise comprising Rayleigh scattering and backward ASE. However, if pulse operation of the injection signal is desired, that is, modulated with short pulses and low duty cycle, the pump power may be integrated over time, extracting amplified injection signal power in short pulses with high energy. In pulsed operation, if the pulse repetition rate is faster than the florescence lifetime of the rare-earth dopant, typically several 100 $\mu$sec. to 1 msec., then, the average injection signal required to suppress scattering noise is approximately equal to the cw injection signal power. Since low duty cycle pulse operation is employed, the required injection source peak power must be higher than in the case of cw injection power operation by the same factor as the duty cycle. However, since the required average injection power level (vis a vis peak power level) is much less than 1 mW, it is possible in this pulse mode operation to couple sufficient peak pulse power into the input face of fiber amplifier $A_1$ by imaging the output from the source on the fiber input face to achieve approximate coupling of a portion of the injection source output beam, as previously illustrated and explained in connection with FIG. 11. In the case of employment of a single mode fiber core as pre-amplifier $A_1$, however, pulse mode operation will require more careful matching of the light from the injection signal source, $I_s$, into this first stage amplifier.

Reference is now made to the embodiment shown in FIG. 12 which discloses a utility in the combination of the first and second basic approaches relative to a first and second stage amplification system or architecture for pulsed operation providing high output power from an array of double clad fiber amplifiers. High pulsed output powers can be achieved from a double clad fiber array configuration using a pulsed lower power laser diode source as an input oscillator. The output power from multi-stage amplifiers can be limited in output power for several reasons. First, the peak output power of the multi-stage amplifier may exceed the damage level of the fiber employed for the amplifiers. Second, the peak output power of the multi-stage amplifier may lead to nonlinear interaction in the fiber resulting in scattering loss reducing the resultant power output level. Third, the pulse energy is limited by the pump power coupled into a single double clad fiber and, in the case of several series coupled stages, the total output power will be limited by coupling losses between amplifier stages. In FIG. 12, these limitations in power output level are reduced if not substantially eliminated by use of the two amplification stages as shown where output 125 from a first amplification stage comprising one or more series connected fiber amplifiers injection pumps a second amplification stage comprising an array of double clad fiber, rare-earth doped amplifiers 130 optically coupled to receive a distributed portion of input 125 for amplification via distribution network 126, such as a star coupler or set of mirrors and multidirectional beam splitter or their equivalent. The output ends of the array amplifiers 130A, 130B, . . . 130n may be combined or arranged in a single output aperture by means of a star coupler or other such optical output integrating means. Amplifiers $A_3$, $A_4$, $A_5$, . . . $A_n$ are pumped by respective pump sources 128.

Injection source, $I_s$, and pump sources, $P_1$ and $P_2$ in the first stage may be pulsed laser diode sources or other pulsed laser sources. The injection source signal, $\lambda_s$, is amplified by a series of either single clad fiber amplifiers or double clad fiber amplifiers or a combination of single clad and double clad amplifiers $A_1$, $A_2$, . . . $A_n$, to provide sufficient average power and peak power to saturate the second stage of the amplifier configuration. Two doped fiber amplifiers 120 and 124 are shown in FIG. 12 in this illustration and are respectively supplied with pumping power from laser sources $P_1$ and $P_2$. Amplifiers $A_1$ and $A_2$ are operated in a manner explained in connection with either the first or second basic approaches explained, respectively, relative to FIGS. 1–5 and FIGS. 6–11.

The output 125 from the first stage is split into a plurality of single mode fibers employing a beam distributing means 126, such as three-way beam splitter 126A and associated mirrors 126B, to distribute the power substantially in a uniform manner over the entire fiber amplifier array 130. As a result, inputs to amplifiers 130A, 130B, 130C, . . . 130n are fairly the same as well as being sufficient to saturate the amplifier. The output can be combined, in the manner as previously indicated, or can be coupled to another array of double clad fiber amplifiers through the employment of a microlens array to combine the light from array 130 in order to optimize output brightness.

Double clad fiber amplifier array 130 are typically operated deep into the saturation regime to optimize the efficiency of these amplifiers. As a result, the output power from each of the double clad fiber amplifiers 130A, 130B, 130C, . . . 130n will not be sensitive to the input power delivered from the first stage, provided that the input power from the first stage is sufficient to saturate the gain of the amplifier array. Moreover, the pump pulsing scheme of the second basic approach, as disclosed relative to FIG. 6, may be employed relative to the first and second stages of FIG. 12 wherein, in the first stage, pump sources $P_1$ and $P_2$ provide pulse outputs of pulse duration 92 relative to duty cycle 96 and pump sources $P_3$, $P_4$, $P_5$ provide pulse outputs of pulse duration 100 relative to duty cycle 104.

The lengths of the fibers comprising the amplifier array 130 should be all substantially of equal length to insure that all of the pulses emitted from the double clad fiber amplifiers 130A, 130B, 130C, . . . 130n overlap or are uniformly synchronized in time. However, different lengths of these fibers may be employed to achieve different delays in time of the pulse output from array 130. Thus, if all pulsed amplified outputs from the amplifiers of array 130 are synchronized, they will be additive either in time or in position so that the single pulse output may be a combined, large output power pulse. On the other hand, if the lengths of the fibers of amplifiers 130A et al are set at selected lengths, output pulse shaping can be accomplished by arranging the output pulses from the respective amplifiers to be overlapped, time synchronized or position synchronized in a manner to produce, for example, a step increasing and step decreasing pulse shape such, as illustrated in FIG. 12A. FIG. 12A represents combined pulse output of an amplifier array 130 comprising 10 amplifiers 130n time sequenced to produce the shaped series of pulses 150 where the fiber lengths of selected amplifiers are selected to be additive in time or position, such as is the case for amplifiers $A_3$, $A_7$, $A_9$ and $A_{10}$ in FIG. 12A. Obviously, any combination of time or position selection of the pulsed output of respective amplifiers $A_1$–$A_{10}$ can be realized.

Reference is now made to FIG. 13 which illustrates an alternative configuration for the first stage of FIG. 12. The first stage of FIG. 13 comprises a single clad or double clad amplifier 120 optically coupled to receive an injection signal, $\lambda_s$, from source, $I_s$, and pump signal, $\lambda_p$ from source, $P_s$, which are combined via beam splitter 123 for input to amplifier 120 via isolator 132 and a second beam splitter 133. The amplified output 135 of amplifier 120 is reflected back into fiber amplifier 120 by reflective element 134 so that amplifier 120 functions as a double-pass amplifier where the returning amplified light is reflected at beam splitter 133 for output 125 to the second stage comprising amplifier array 130 in FIG. 12. Any returning light from amplifier 120 that returns through beam splitter and the path back to injection source, $I_s$, is terminated at isolator 132. Amplifier 120 may be operated in a manner explained in connection with the first basic approach previously explained relative to FIGS. 1–5.

Reference is now made to one additional aspect of this invention which relates to providing pumping sources for the amplifier systems of the various embodiments of this invention providing for optimum optical power pumping in spite of changes in operating temperature which causes changes in the wavelength of the pump source. Optical amplifying media consisting of a single core fiber or a double clad fiber may be utilized wherein, respectively, the core or inner cladding is doped with a rare-earth ionic species providing a predetermined gain spectrum for the fiber to which the pumping wavelength must be matched. Since the gain spectrum of the laser diode pump sources changes as the temperature changes, a given pumping source coupled to the fiber amplifier may no longer match the gain spectrum of the fiber if the laser pump source begins operating at a different operating temperature. As a result, insufficient amplification of the injection source signal will occur. One approach for correction of this situation is to provide a pump source comprising a plurality of different spatially separate wavelengths which are all coupled into the fiber amplifier. As the multi-wavelength laser diode pump source changes wavelength with temperature, such as in a range within about −15° C. to about 125° C., at least one of the output wavelengths will overlap the gain spectrum of the fiber amplifier sufficiently to continually provide high input power for pumping of the fiber. Such a monolithic multisource laser diode device 140 is shown in FIG. 14 having a plurality of laser stripes wherein single stripes of or groups of laser stripes may be designed to operate at different wavelengths $\lambda_1$, $\lambda_2$, $\lambda_3$ and $\lambda_4$. These different outputs my alternatively be provided by separate laser sources. The output of device 140 is then imaged through conventional optics 142 via beam splitter 144 into rare-earth doped, optical fiber amplifier 146. A portion of the output from amplifier 146 is received by detector 150 via beam splitter 148 to provide feedback to laser diode device 140 via current controller 152 which is sensitive to at least a portion of the optical output from fiber amplifier 146 to vary, e.g. increase, the current excitation level of laser diode 140 to simultaneously provide optimized pump power within the gain spectrum of fiber amplifier 146.

Alternatively, pumping source 140 in this embodiment may be comprised of a series of separate laser diodes operating or tunable to different wavelengths as shown in FIG. 15A. Laser diode sources 160, 161 and 162 may be individual multimode laser diodes or diode laser bars producing, respectively, the wavelength spectrums or bands 163, 164 and 165, as illustrated in FIG. 15B. Wavelength spectrums may be extenuated in wavelength relative to each other or slightly overlapped in wavelength. The extent of the wavelength bandwidth across spectrums or bands 163, 164 and 165 may be in the range of 20 nm to 30 nm. Sources 160–162 have their outputs coupled via lens systems 166 into respective optical fibers 167, 168 and 169 which at their output end, are tightly bundled together for focused coupling of their light beams by lens 170 into doped inner cladding layer 172 of double clad fiber amplifier 171. The injection signal is provided to core 173 of fiber 171 for amplification. As in the case of FIG. 14, a portion of the output from fiber amplifier 171 may be diverted to detector 150 and current controller 152 to vary the current excitation level of the individual laser diode sources 160–162 to simultaneously provide optimized pump power within the gain spectrum of fiber amplifier 171.

In either case of separate or integrated laser sources of different wavelengths, the multi-wavelength pumping source is coupled either by a dichroic beam combiner and focusing lens system to the input of fiber amplifier 146, as shown in FIG. 14, or the individual outputs of sources are butt coupled to respective optical fibers and bundled for optical coupling, such as by means of a focusing lens system, as shown in the case of fiber amplifier 171 in FIG. 15A.

In FIG. 16, to an injection source 180 of narrow wavelength emission is shown with pumping source 181 where the beams are combined via polarizing beam splitter or dichroic mirror 182 for focused input via lens system 183 into the single mode, fiber core 185 of single core fiber 184.

FIG. 16 discloses a reliable pump architecture commensurate, for example, with a 3 W transmitter operating at standard communication wavelength of 1.55 µm. The pump is reliable because several pump laser diodes operating at identical wavelength are utilized to pump several fiber lasers which are utilized to pump several fiber amplifiers. Each plural pumping source may be coupled to a high power Nd doped double clad fiber laser pumping source operating, for example, at 1.06 µm with an output of about 2 W. Each of the outputs from these laser diode pumping sources is matched to the wavelength band for pump absorption to a respective Nd doped double clad fiber laser pumping source. The Nd doped double clad fiber laser pumping source is then optically coupled to pump one of a series of coupled Er doped or Er:Yb doped, single mode fiber amplifiers or a series of double clad fiber amplifiers. Thus, a 1.55 µm injection signal may be amplified by, for example, four Er doped fiber single mode amplifiers each pumped by a Nd doped double clad fiber laser which, in turn, is pumped by a plurality of laser diode sources operating at the same wavelength. One such pumping source is shown in FIG. 17 at 190 for a multimode double clad fiber pumping laser 195. Pumping source 190 comprises an array of fiber coupled laser diodes, $P_1$, $P_2$, $P_3$, ... $P_n$, operating all at the same wavelength which is wavelength matched, e.g., 807 nm, to the absorption band width of the Nd doped double clad fiber laser source 195 which provides a pumping wavelength at 1.06 µm. Source 190 is coupled by fibers 191, 192, 193, 194 to source 195 via bundled or multiplexer coupler 196, and the output from coupler 196 is reimaged by lens system 197 to match the aperture and numerical aperture of double clad fiber laser source 195. Reliability of the overall pump architecture is greatly increased by derating the power of pump laser diodes $P_1$, $P_2$, $P_3$, ... $P_n$, and adding additional pump laser diodes. Based upon his architecture, it is possible to couple at least thirty to ninety pump sources or higher, $P_1$, $P_2$, $P_3$, ... $P_n$, to a typical Nd doped double clad fiber laser source with associated improvements achieved in reliability.

The architecture of FIG. 17 has two levels of redundancy. First, double clad fiber 195 is pumped by a plurality of laser diode sources. This allows for redundant power supply options so that groups of pump laser diodes can be driven in series by many different power supplies. In the extreme case, one power supply can be provided for each pump laser diode but several such sources of a plurality of sources can be driven by single power supply source providing for power supply reliability despite particular power supply shutdowns so that operation of the communication link can be still maintained. No thermoelectric coolers are generally required since the 30 nm bandwidth of the Nd double clad laser 195 allows for a broad range of operating temperatures without the need for such coolers.

The second level of redundancy is in the employment of individual laser diode sources, $P_n$, that are composed of arrays of separated single mode lasers. Segmentation of laser diode sources, $P_n$, into arrays of single mode sources reduces lateral propagation of dark line defects. Moreover, facet damage caused to one segment does not effect operation of an adjacent segment so that the array reliability can be evaluated as though pump power was being provided by independent, individual single mode pump sources.

In view of the pulse modulation employed in the practice of some of the embodiments of this invention, chirping may result in modulating of the injection source, $I_s$. Chirping is the phenomenon where changes in wavelength are caused by modulation of the current applied to the laser source due to changes in current through the device resulting in carrier density changes affecting the laser wavelength. Therefore, the wavelength of the laser source changes slightly during application of the current pulses to modulate the laser source. There are applications of the instant invention where such wavelength changes are undesirable, such as in the case of coherent LIDAR, where the exact wavelength must be maintained during modulation, i.e., during application of the pulse. In such cases, rather than modulate the laser, via its applied current, a separate modulator for phase or for intensity modulation can be utilized. In this case, the output of the injection laser source is coupled to a phase or intensify modulator via a single mode fiber where the light intensity modulation, for example, can be carried out without current modulation of the laser source itself. Of course, this separated modulation can also be applied to the pumping sources as well if desired Although the invention has been described in conjunction with one or more preferred embodiments, it will be apparent to those skilled in the art that other alternatives, variations and modifications will be apparent in light of the foregoing description as being within the spirit and scope of the invention. Thus, the invention described herein is intended to embrace all such alternatives, variations and modifications that are within the spirit and scope of the following claims.

What is claimed is:

1. A cascaded optical amplifier system having at least two optical amplifying stages comprising:
    an injection source providing a pulsed injection signal to be amplified;
    a first pump source providing a first pump signal;
    a first amplifying medium receiving as input said signals wherein said pulsed injection signal is amplified to a first power and energy level;
    a second amplifying medium optically coupled to said first amplifying medium to receive as input said first level amplified, injection pulsed signal;
    a second pump source providing a second pump signal for input to said second amplifying medium along with said first level amplified, injection pulsed signal;
    at least one of said pump sources being pulsed;
    pulse positions of said injection pulsed optical signal being synchronized with pulse positions of said pulsed pump signal.

2. The cascaded optical amplifier system of claim 1 wherein both of said pump sources are pulsed, pulse positions of said injection pulsed optical signal being synchronized with pulse positions of said first and second pulsed pump signals.

3. The cascaded optical amplifier system of claim 2 wherein said first pulsed pump signal is provided with substantially the same pulse duration as said second pulsed pump signal.

4. The cascaded optical amplifier system of claim 2 wherein said first pulsed pump signal is provided with a different pulse duration than said second pulsed pump signal.

5. The cascaded optical amplifier system of claim 4 wherein the pulse duration of said first pulsed pump signal is shorter than the pulse duration of said second pulsed pump signal.

6. The cascaded optical amplifier system of claim 1 comprising a plurality of said amplifying media optically coupled in series forming a plurality of stages, each stage with a respective pump source providing a pulsed pump signal for input to its respective amplifying medium along with an amplified injection pulse signal from a previous coupled stage, the pulse duration of said pulsed pump signals being different from one another.

7. The cascaded optical amplifier system of claim 6 wherein the pulse duration of said pulsed pump signals are sequentially of increased length from the first of said pulsed pump signals.

8. The cascaded optical amplifier system of claim 1 wherein said first pulsed pump signal is provided as a direct input to said first amplifying medium and said second pulsed pump signal is provided as a direct input to said second amplifying medium.

9. The cascaded optical amplifier system of claim 1 wherein said first and second pulsed pump signals are provided as a direct input to said first amplifying medium, said second pulsed pump signal transparent to an absorption spectra of said first amplifying medium and transmitted therethrough as a direct input to said second amplifying medium.

10. The cascaded optical amplifier system of claim 9 wherein said first and second amplifying media are optical fiber amplifiers doped with different core dopants.

11. The cascaded optical amplifier system of claim 1 wherein said first and second amplifying media are optical fiber amplifiers.

12. The cascaded optical amplifier system of claim 1 wherein said optical fiber amplifiers are double clad fiber amplifiers.

13. The cascaded optical amplifier system of claim 1 wherein said first and second amplifying media are solid state gain media.

14. The cascaded optical amplifier system of claim 1 wherein said first and second amplifying media are a combination of solid state gain media where at least one of said media is an optical fiber amplifier.

15. The cascaded optical amplifier system of claim 1 wherein said first and second amplifying media are doped optical waveguides.

16. The cascaded optical amplifier system of claim 1 wherein said system is employed in a printing system.

17. The cascaded optical amplifier system of claim 1 wherein said system is employed in a LIDAR system.

18. The cascaded optical amplifier system of claim 1 wherein said system is employed in a nonlinear frequency conversion system.

19. The cascaded optical amplifier system of claim 1 wherein said optical fiber amplifier is employed in pyrotechnics.

20. The cascaded optical amplifier system of claim 1 wherein said optical fiber amplifier is employed for material processing.

21. The cascaded optical amplifier system of claim 1 wherein said injection source includes a resonant laser cavity with a grating reflector therein.

22. The cascaded optical amplifier system of claim 1 wherein said injection source includes a lightwave gain region in a portion of an optical internal cavity therein, said gain region portion having a lateral dimension along its length in said optical internal cavity greater than a lateral dimension along other portions of said optical internal cavity.

23. The cascaded optical amplifier system of claim 22 wherein said gain region is a flared region.

24. The cascaded optical amplifier of claim 22 wherein a pulsed electric current is injected into only a portion of said gain region, other portions of said gain region having independent current injection means therefor.

25. The cascaded optical amplifier system of claim 1 wherein said pulsed injection signal has a pulse length or duration in the range of 10 nsec or less to about 1 $\mu$sec.

26. The cascaded optical amplifier system of claim 1 wherein an interpulse time interval of said injection source pulses is less than a fluorescence time constant of said first amplifying medium.

27. The cascaded optical amplifier system of claim 1 wherein said pump source comprises a diode laser array.

28. The cascaded optical amplifier system of claim 1 wherein optical pump radiation provided by said first and second pump sources to said first and second amplifying media are, respectively, pulses having a pulse duration substantially equal to or less than a fluorescence time constant of a gain dopant, respectively, provided in said first and second optical media.

29. The cascaded optical amplifier system of claim 28 wherein said optical pump pulses provided by said first and second pump sources to said first and second amplifying media are of different duration.

30. The cascaded optical amplifier system of claim 1 wherein optical pump radiation provided by said first and second pump sources to said first and second amplifying media are, respectively, pulses having a pulse duration, respectively, less than and substantially equal to a fluorescence time constant of a gain dopant, respectively, provided in said first and second optical media.

31. The cascaded optical amplifier system of claim 30 wherein said injection signal pulses from said injection source coincide with the end of said first and second pump source pulses.

32. The cascaded optical amplifier system of claim 31 wherein said injection signal pulses from said injection source coincide with the end of said first and second pump source pulses.

33. The cascaded optical amplifier system of claim 1 wherein said first and second amplifying media are optical fibers, the core of said optical fibers are doped with at least one ionic species selected from the group consisting of $Nd^{3+}$, $Yb^{3+}$, $Er^{3+}$, $Tm^{3+}$, and $Ho^{3+}$.

34. The cascaded optical amplifier system of claim 33 wherein the core of said first and second optical fiber amplifiers are single mode.

35. The cascaded optical amplifier system of claim 33 wherein the inner cladding of at least one of said optical fiber amplifiers is multimode.

36. The cascaded optical amplifier system of claim 33 wherein said first optical fiber amplifier is a multimode fiber and said second optical fiber amplifier is a single mode fiber.

37. The cascaded optical amplifier system of claim 1 further comprising suppression means incorporated relative to said first and second amplifying media for suppressing scattering noise.

38. The cascaded optical amplifier system of claim 37 wherein said suppression means is coupled between said amplifying media.

39. The cascaded optical amplifier system of claim 37 wherein said suppression means is formed in either of said amplifying media.

40. The cascaded optical amplifier system of claim 37 wherein said suppression means comprises at least one optical isolator, synchronized switch, narrow band filter, saturable absorber, or optical circulator.

41. The cascaded optical amplifier system of claim 37 wherein said first and second pump sources are fiber coupled to said amplifying media and comprise a plurality of semiconductor laser diodes to provide redundancy in said system.

42. The cascaded optical amplifier system of claim 1 including means in said injection source to mode lock or Q-switch its operation.

43. The cascaded optical amplifier system of claim 1 wherein said at least two optical amplifying stages comprise two optically coupled double clad fiber amplifiers each having a core and an inner cladding, input coupling of said injection signal by overlapped imaging said pulsed injection signal from said injection source onto said first double clad fiber amplifier core reducing alignment sensitivity requirements for said input coupling as well as any feedback of said injection signal back to said injection source.

44. The cascaded optical amplifier system of claim 1 further comprising a another amplifying stage optically coupled between said injection source and input to said at least two optical amplifying stages, said third stage comprising a single core, rare-earth doped fiber amplifier.

45. The cascaded optical amplifier system of claim 44 wherein said first and second amplifying media are doped optical waveguides.

46. The cascaded optical amplifier system of claim 45 wherein said doped waveguides are double clad optical fiber amplifiers.

47. The cascaded optical amplifier system of claim 1 further comprising a another amplifying stage optically coupled between said injection source and input to said at least two optical amplifying stages, said third stage comprising a single core or double clad amplifier doped with $\mu$-level rare-earth ion.

48. The cascaded optical amplifier system of claim 1 further comprising a third stage optically coupled between said injection source and input to said at least two optical amplifying stages, said third stage having high gain amplifying average signal powers less than 1 mW to about 100 mW.

49. The cascaded optical amplifier system of claim 1 wherein said at least two optical amplifying stages comprise two optically coupled double clad fiber amplifiers each having a core and an inner cladding, the core of said double clad fiber amplifiers being doped with rare-earth ionic species, said rare-earth ionic species characterized by a fluorescence time constant, the pulse rate of said pump source being less than the fluorescence time constant of said rare-earth ionic species in at least one of said double clad fiber amplifiers.

50. The cascaded optical amplifier system of claim 49 wherein said pulse rate of said injection source is provided with a sufficient interpulse time interval to permit gain recovery in said at least one of said double clad fiber amplifiers via said pump source.

51. The cascaded optical amplifier system of claim 49 wherein said pulse rate has a frequency matching a round trip travel time of light within a resonant cavity of said laser injection source so as to mode lock said injection source.

52. The cascaded optical amplifier system of claim 1 wherein at least one of said sources is coupled to one end of a single mode fiber, a modulator coupled to another end of said single mode fiber to modulate phase or intensity of output from said at least one source, said modulator coupled as input to said first amplifying medium.

53. An optical fiber amplifier system comprising:
   at least a single stage fiber amplifier having a doped core capable of gain and absorption;
   a pump source providing a pulsed pumping wavelength for absorption by the amplifier gain;
   an injection signal source for providing a pulsed signal source;
   the synchronization of the timing relationship of the pulse input of said pump and injection source pulses so that a substantial portion of developed gain in said fiber amplifier is available for absorption by said injection signal.

54. The optical fiber amplifier system of claim 53 wherein the synchronization of the timing relationship of the pulse input of said pump and injection source pulses is optimized so that said injection signal receives maximum available gain from said fiber amplifier.

55. The optical fiber amplifier system of claim 53 wherein said single stage fiber amplifier is a double clad fiber amplifier having a rare-earth doped core and an inner cladding.

56. The optical fiber amplifier system of claim 53 wherein said pump and injection source pulses are of the same duration.

57. The optical fiber amplifier system of claim 53 wherein said pump and injection source pulses are of a different duration.

58. The optical fiber amplifier system of claim 53 wherein there are two stage fiber amplifiers each having a doped core capable of gain and absorption, a pumping source for each of said amplifiers wherein one of said pump sources is pulsed to provide a pulsed pump signal to its corresponding amplifier, pulse positions of said injection signal being synchronized with pulse position of said pulsed pump signals.

59. The optical fiber amplifier system of claim 53 wherein there are two stage fiber amplifiers each having a doped core capable of gain and absorption, a pumping source for each of said amplifiers wherein said pump sources are pulsed to provide respective pulsed pump signals, pulse positions of said injection signal being synchronized with pulse positions of said pulsed pump signals.

60. The optical fiber amplifier system of claim 59 wherein said first pulsed pump signal is provided with substantially the same pulse duration as said second pulsed pump signal.

61. The optical fiber amplifier system of claim 59 wherein said first pulsed pump signal is provided with a different pulse duration than said second pulsed pump signal.

62. The optical fiber amplifier system of claim 61 wherein the pulse duration of said first pulsed pump signal is shorter than the pulse duration of said second pulsed pump signal.

63. The optical fiber amplifier system of claim 59 wherein optical pump radiation provided by said pumping sources to said amplifiers are, respectively, pulses having a pulse duration, respectively, less than and substantially equal to a fluorescence time constant of a gain dopant, respectively, provided in said amplifiers.

64. The optical fiber amplifier system of claim 63 wherein said injection signal pulse from said injection in each duty cycle source coincides with the end of said pump source pulses.

65. The optical fiber amplifier system of claim 63 wherein said injection signal pulse from said injection source in each duty cycle source is near the end of said pump source pulses.

66. The optical fiber amplifier system of claim 63 wherein said injection signal pulse from said injection source in each duty cycle source overlap a portion of said pump source pulses.

67. A multiple stage fiber amplifier system comprising:
a first stage fiber amplifier having its output coupled to a second stage fiber amplifier;
an injection source providing a pulsed injection signal coupled as input into the first stage fiber amplifier a the amplified pulsed injection signal further amplified in the second stage fiber amplifier;
a first and second pump source providing a first and second pulsed pump signal respectively to the first and second stage fiber amplifiers;
wherein the first pulsed pump signal is of shortened duration than the second pulsed pump signal and shorter than the fluorescence time constant of the first stage fiber amplifier so that there is insufficient time for scattering noise build-up in the first stage amplifier.

68. A cascaded optical amplifier system comprising:
an injection source providing a pulsed injection signal to be amplified;
a first amplifying medium receiving as input said pulsed injection signal thereby providing an amplified pulsed injection signal;
a second amplifying medium optically coupled to said first amplifying medium receiving as input said amplified pulse injection signal and further amplifying said amplified pulsed injection signal;
a first pump source providing a first pump signal coupled as input into said first amplifying medium, the first pump signal being pulsed synchronously in time with the pulsed injection signal, having a first duty cycle and a first pulse length; and
a second pump source providing a second pump signal coupled as input into said second amplifying medium, the second pump signal being pulsed synchronously in time with the pulsed injection signal, having a second duty cycle and a second pulse length different from the first duty cycle and the first pulse length.

69. The cascaded optical amplifier system of claim 68 wherein said first pulsed pump signal is provided with substantially the same pulse duration as said second pulsed pump signal.

70. The cascaded optical amplifier system of claim 68 wherein the pulse duration of said first pulsed pump signal is shorter than the pulse duration of said second pulsed pump signal.

71. The cascaded optical amplifier system of claim 68 wherein said first and second amplifying media are optical fiber amplifiers.

72. The cascaded optical amplifier system of claim 68 wherein at least one of said amplifiers is a double clad fiber amplifier.

73. The cascaded optical amplifier system of claim 68 wherein said pulsed injection signal has a pulse length of duration in the range of 10 nsec or less to about 1 $\mu$sec.

74. The cascaded optical amplifier system of claim 68 wherein an interpulse time interval of said injection source pulses is less than a fluorescence time constant of said first amplifying medium.

75. The cascaded optical amplifier system of claim 68 wherein said pump source comprises a diode laser array.

76. The cascaded optical amplifier system of claim 68 wherein the first and second pump pulses have a pulse duration substantially equal to or less than a fluorescence time constant of gain dopant, respectively, provided in said first and second optical media.

77. The cascaded optical amplifier system of claim 68 wherein said first and second amplifying media are doped optical waveguides.

78. The cascaded optical amplifier system of claim 77 wherein said doped waveguides are double clad fiber amplifiers.

79. The cascaded optical amplifier system of claim 68 wherein said at least two optical amplifying stages comprise two optically coupled double clad fiber amplifiers each having a core and an inner cladding, the core of said double clad fiber amplifiers being doped with rare-earth ionic species, said rare-earth ionic species having a fluorescence time constant, the pulse rate of said pump source being less than the fluorescence time constant of said rare-earth ionic species in at least one of said double clad fiber amplifiers.

80. The cascaded optical amplifier system of claim 79 wherein said pulse rate of said injection source is provided with a sufficient interpulse time interval to permit gain recovery in said at least one of said double clad fiber amplifiers via said pump source.

81. The cascaded optical amplifier system of claim 79 wherein said pulse rate has a frequency matching a round trip travel time of light within a resonant cavity of said laser injection source so as to mode lock said injection source.

82. The cascaded optical amplifier system of claim 68 wherein at least one of said pump sources is coupled to one end of a single mode fiber, a modulator coupled to another end of said single mode fiber to modulate phase or intensity of output from said at least one pump source, said modulator coupled as input to said first amplifying medium.

* * * * *